(12) United States Patent
Zhao et al.

(10) Patent No.: US 9,046,983 B2
(45) Date of Patent: Jun. 2, 2015

(54) HIERARCHICALLY-ORGANIZED CONTROL GALLERIES

(75) Inventors: Jason Xiaobo Zhao, San Jose, CA (US); Julie Ann Guinn, Seattle, WA (US); Ryan Charles Hill, Mountain View, CA (US); Mark Pearson, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

(21) Appl. No.: 12/464,584

(22) Filed: May 12, 2009

(65) Prior Publication Data

US 2010/0293470 A1 Nov. 18, 2010

(51) Int. Cl.
G06F 3/0482 (2013.01)
G06F 3/0481 (2013.01)
G06F 17/24 (2006.01)

(52) U.S. Cl.
CPC .............. *G06F 3/0481* (2013.01); *G06F 17/24* (2013.01)

(58) Field of Classification Search
CPC .............................. G06F 3/0482; G06F 3/0481
USPC .......................................................... 715/732
See application file for complete search history.

(56) References Cited

U.S. PATENT DOCUMENTS

| | | |
|---|---|---|
| 4,823,283 A | 4/1989 | Diehm |
| 5,155,806 A | 10/1992 | Hoeber |
| 5,220,675 A | 6/1993 | Padawer |
| 5,247,438 A | 9/1993 | Subas |
| 5,305,435 A | 4/1994 | Bronson |
| 5,307,086 A | 4/1994 | Griffin et al. |
| 5,323,314 A | 6/1994 | Baber |
| 5,377,354 A | 12/1994 | Scannell |
| 5,412,772 A | 5/1995 | Monson |
| 5,457,476 A | 10/1995 | Jenson |
| 5,461,708 A | 10/1995 | Kahn |
| 5,500,936 A | 3/1996 | Allen |
| 5,502,805 A * | 3/1996 | Anderson et al. ............. 715/209 |

(Continued)

FOREIGN PATENT DOCUMENTS

| | | |
|---|---|---|
| AU | 2005203411 | 3/2006 |
| AU | 200702550743 | 8/2012 |

(Continued)

OTHER PUBLICATIONS

Office 2007, Microsoft, Released on Nov. 6, 2006.*

(Continued)

*Primary Examiner* — Reza Nabi
(74) *Attorney, Agent, or Firm* — Steve Crocker; Jim Ross; Micky Minhas

(57) ABSTRACT

A computing system provides a graphical user interface having hierarchically-organized control galleries. The computing system displays the graphical user interface on a display device. The graphical user interface contains a document area and a control ribbon. The document area contains at least a portion of a document that a user is editing. The control ribbon includes a class control gallery. The class control gallery includes a plurality of class controls associated with different classes of related commands. The computing system displays a variation control gallery containing variation controls in a class associated with a selected one of the class controls. In response to a selection of a variation control in the variation control gallery, the computing system applies a command associated with the variation control to a document in the document area.

20 Claims, 6 Drawing Sheets

(56) References Cited

U.S. PATENT DOCUMENTS

| | | |
|---|---|---|
| 5,519,606 A | 5/1996 | Frid-Nielsen |
| 5,559,875 A | 9/1996 | Bieselin |
| 5,559,944 A | 9/1996 | Ono |
| 5,570,109 A | 10/1996 | Jenson |
| 5,581,677 A | 12/1996 | Myers et al. |
| 5,588,107 A | 12/1996 | Bowden |
| 5,592,602 A * | 1/1997 | Edmunds et al. .............. 345/474 |
| 5,596,694 A | 1/1997 | Capps |
| 5,625,783 A | 4/1997 | Ezekiel |
| 5,634,100 A | 5/1997 | Capps |
| 5,634,128 A | 5/1997 | Messina |
| 5,638,504 A | 6/1997 | Scott |
| 5,644,737 A | 7/1997 | Tuniman |
| 5,659,693 A | 8/1997 | Hansen |
| 5,664,127 A | 9/1997 | Anderson |
| 5,664,208 A | 9/1997 | Pavley |
| 5,673,403 A | 9/1997 | Brown |
| 5,721,847 A | 2/1998 | Johnson |
| 5,734,915 A | 3/1998 | Roewer |
| 5,760,768 A | 6/1998 | Gram |
| 5,760,773 A | 6/1998 | Berman |
| 5,761,646 A | 6/1998 | Frid-Nielsen |
| 5,764,960 A * | 6/1998 | Perks et al. .................... 715/841 |
| 5,778,402 A | 7/1998 | Gipson |
| 5,778,404 A | 7/1998 | Capps |
| 5,787,295 A | 7/1998 | Nakao |
| 5,793,365 A | 8/1998 | Tang et al. |
| 5,796,393 A | 8/1998 | MacNaughton et al. |
| 5,805,167 A | 9/1998 | Van Cruyningen |
| 5,812,132 A | 9/1998 | Goldstein |
| 5,821,936 A | 10/1998 | Shaffer |
| 5,828,376 A | 10/1998 | Solimene |
| 5,838,321 A | 11/1998 | Wolf |
| 5,842,009 A | 11/1998 | Borovoy |
| 5,844,558 A | 12/1998 | Kumar |
| 5,844,572 A | 12/1998 | Schott |
| 5,844,588 A * | 12/1998 | Anderson .................... 347/135 |
| 5,855,006 A | 12/1998 | Huemoeller |
| 5,864,848 A | 1/1999 | Horvitz et al. |
| 5,872,973 A | 2/1999 | Mitchell |
| 5,873,108 A | 2/1999 | Goyal |
| 5,874,953 A | 2/1999 | Webster et al. |
| 5,885,006 A | 3/1999 | Sheedy |
| 5,893,073 A | 4/1999 | Kasso |
| 5,893,125 A | 4/1999 | Shostak |
| 5,898,436 A | 4/1999 | Stewart |
| 5,899,979 A | 5/1999 | Miller |
| 5,905,863 A | 5/1999 | Knowles |
| 5,917,489 A | 6/1999 | Thurlow et al. |
| 5,924,089 A | 7/1999 | Mocek et al. |
| 5,926,806 A | 7/1999 | Marshall |
| 5,936,625 A | 8/1999 | Kahl |
| 5,937,160 A | 8/1999 | Davis |
| 5,940,078 A | 8/1999 | Nagarajayya |
| 5,940,847 A | 8/1999 | Fein |
| 5,943,051 A | 8/1999 | Onda |
| 5,960,406 A | 9/1999 | Rasansky |
| 5,970,466 A | 10/1999 | Detjen |
| 5,999,173 A * | 12/1999 | Ubillos ......................... 715/724 |
| 5,999,938 A | 12/1999 | Bliss |
| 6,008,806 A | 12/1999 | Nakajima |
| 6,012,075 A | 1/2000 | Fein |
| 6,016,478 A | 1/2000 | Zhang |
| 6,018,343 A | 1/2000 | Wang |
| 6,034,683 A | 3/2000 | Mansour |
| 6,038,395 A | 3/2000 | Chow |
| 6,038,542 A | 3/2000 | Ruckdashel |
| 6,043,816 A | 3/2000 | Williams et al. |
| 6,067,087 A | 5/2000 | Krauss et al. |
| 6,067,551 A | 5/2000 | Brown |
| 6,072,492 A | 6/2000 | Schagen |
| 6,073,110 A | 6/2000 | Rhodes et al. |
| 6,073,142 A | 6/2000 | Geiger |
| 6,085,206 A | 7/2000 | Domini |
| 6,088,707 A * | 7/2000 | Bates et al. .................... 715/235 |
| 6,092,103 A * | 7/2000 | Pritsch .......................... 709/206 |
| 6,101,480 A | 8/2000 | Conmy |
| 6,133,915 A | 10/2000 | Arcuri |
| 6,154,755 A | 11/2000 | Dellert et al. |
| 6,175,363 B1 | 1/2001 | Williams |
| 6,188,403 B1 | 2/2001 | Sacerdoti |
| 6,192,381 B1 | 2/2001 | Stiegemeier |
| 6,195,094 B1 | 2/2001 | Celebiler ...................... 715/764 |
| 6,199,102 B1 | 3/2001 | Cobb |
| 6,211,879 B1 | 4/2001 | Soohoo |
| 6,216,122 B1 | 4/2001 | Elson |
| 6,219,670 B1 | 4/2001 | Mocek |
| 6,222,540 B1 | 4/2001 | Sacerdoti |
| 6,232,971 B1 | 5/2001 | Haynes |
| 6,236,396 B1 | 5/2001 | Jenson |
| 6,237,135 B1 | 5/2001 | Timbol |
| 6,239,798 B1 | 5/2001 | Ludolph et al. |
| 6,256,628 B1 | 7/2001 | Dobson |
| 6,269,341 B1 | 7/2001 | Redcay, Jr. |
| 6,272,488 B1 * | 8/2001 | Chang et al. .................. 707/769 |
| 6,278,450 B1 | 8/2001 | Arcuri |
| 6,289,317 B1 | 9/2001 | Peterson |
| 6,307,544 B1 | 10/2001 | Harding |
| 6,307,574 B1 * | 10/2001 | Ashe et al. .................... 715/765 |
| 6,311,195 B1 | 10/2001 | Hachiya et al. |
| 6,313,854 B1 | 11/2001 | Gibson |
| 6,323,883 B1 | 11/2001 | Minoura |
| 6,326,962 B1 | 12/2001 | Szabo |
| 6,327,046 B1 | 12/2001 | Miyamoto |
| 6,341,277 B1 | 1/2002 | Coden |
| 6,342,901 B1 | 1/2002 | Adler et al. |
| 6,353,451 B1 | 3/2002 | Teibel |
| 6,356,893 B1 | 3/2002 | Itakura et al. |
| 6,359,634 B1 | 3/2002 | Cragun |
| 6,369,840 B1 | 4/2002 | Barnett et al. |
| 6,373,507 B1 | 4/2002 | Camara |
| 6,374,304 B1 | 4/2002 | Chiashi |
| 6,384,849 B1 | 5/2002 | Morcos |
| 6,385,769 B1 | 5/2002 | Lewallen |
| 6,405,216 B1 | 6/2002 | Minnaert |
| 6,424,829 B1 | 7/2002 | Kraft |
| 6,429,882 B1 | 8/2002 | Abdelnur |
| 6,430,563 B1 | 8/2002 | Fritz |
| 6,433,801 B1 | 8/2002 | Moon |
| 6,433,831 B1 | 8/2002 | Dinwiddie |
| 6,434,598 B1 | 8/2002 | Gish |
| 6,442,527 B1 | 8/2002 | Worthington |
| 6,446,118 B1 | 9/2002 | Gottlieb |
| 6,456,304 B1 | 9/2002 | Angiulo |
| 6,457,062 B1 | 9/2002 | Pivowar |
| 6,459,441 B1 | 10/2002 | Perroux |
| 6,466,236 B1 | 10/2002 | Pivowar |
| 6,469,722 B1 | 10/2002 | Kineo |
| 6,469,723 B1 * | 10/2002 | Gould et al. .................. 715/837 |
| 6,480,865 B1 | 11/2002 | Lee |
| 6,484,180 B1 | 11/2002 | Lyons |
| 6,493,006 B1 | 12/2002 | Gourdol |
| 6,493,007 B1 | 12/2002 | Pang |
| 6,493,731 B1 * | 12/2002 | Jones et al. .................... 715/234 |
| 6,507,845 B1 | 1/2003 | Cohen et al. |
| 6,529,918 B2 | 3/2003 | Takahashi |
| 6,546,417 B1 | 4/2003 | Baker |
| 6,567,509 B1 | 5/2003 | Gusler et al. |
| 6,570,596 B2 | 5/2003 | Frederiksen |
| 6,578,192 B1 | 6/2003 | Boehme |
| 6,583,798 B1 | 6/2003 | Hoek |
| 6,584,501 B1 | 6/2003 | Cartsonis et al. |
| 6,603,493 B1 * | 8/2003 | Lovell et al. .................. 715/800 |
| 6,618,732 B1 | 9/2003 | White |
| 6,621,504 B1 | 9/2003 | Nadas |
| 6,621,508 B1 | 9/2003 | Shiraishi |
| 6,633,867 B1 * | 10/2003 | Kraft et al. .................... 705/26.1 |
| 6,635,089 B1 | 10/2003 | Burkett |
| 6,654,791 B1 | 11/2003 | Bates et al. |
| 6,664,983 B2 | 12/2003 | Ludolph |
| 6,680,749 B1 | 1/2004 | Anderson |
| 6,686,938 B1 | 2/2004 | Jobs |
| 6,691,281 B1 | 2/2004 | Sorge |
| 6,701,513 B1 | 3/2004 | Bailey |

(56) References Cited

U.S. PATENT DOCUMENTS

| | | | |
|---|---|---|---|
| 6,707,454 B1 | 3/2004 | Barg | |
| 6,708,205 B2 | 3/2004 | Sheldon | |
| 6,721,402 B2 | 4/2004 | Usami | |
| 6,727,919 B1 | 4/2004 | Reder | |
| 6,732,330 B1 | 5/2004 | Claussen | |
| 6,734,880 B2 | 5/2004 | Chang | |
| 6,750,850 B2 | 6/2004 | O'Leary | |
| 6,750,890 B1 | 6/2004 | Sugimoto | |
| 6,785,868 B1 | 8/2004 | Raff | |
| 6,789,107 B1 | 9/2004 | Bates et al. | |
| 6,799,095 B1 | 9/2004 | Owen et al. | |
| 6,816,904 B1* | 11/2004 | Ludwig et al. | 709/226 |
| 6,825,859 B1 | 11/2004 | Severenuk | |
| 6,826,729 B1* | 11/2004 | Giesen et al. | 715/837 |
| 6,832,244 B1 | 12/2004 | Raghunandan | |
| 6,847,989 B1 | 1/2005 | Chastain et al. | |
| 6,850,255 B2 | 2/2005 | Muschetto | |
| 6,871,195 B2 | 3/2005 | Ryan | |
| 6,882,353 B2 | 4/2005 | Nettles et al. | |
| 6,882,354 B1 | 4/2005 | Nielsen | |
| 6,895,426 B1 | 5/2005 | Cortright et al. | |
| 6,904,449 B1 | 6/2005 | Quinones | |
| 6,906,717 B2 | 6/2005 | Couckuyt | |
| 6,907,423 B2* | 6/2005 | Weil et al. | 1/1 |
| 6,915,492 B2 | 7/2005 | Kurtenbach | |
| 6,924,797 B1 | 8/2005 | MacPhail | |
| 6,925,605 B2 | 8/2005 | Bates | |
| 6,928,613 B1* | 8/2005 | Ishii et al. | 715/726 |
| 6,934,740 B1 | 8/2005 | Lawande et al. | |
| 6,941,304 B2 | 9/2005 | Gainey | |
| 6,956,429 B1 | 10/2005 | Elbanhawy | |
| 6,964,025 B2 | 11/2005 | Angiulo | |
| 6,981,209 B1 | 12/2005 | Parikh et al. | |
| 6,983,889 B2 | 1/2006 | Alles | |
| 6,988,241 B1 | 1/2006 | Guttman | |
| 6,990,637 B2 | 1/2006 | Anthony | |
| 6,990,652 B1 | 1/2006 | Parthasarathy | |
| 6,990,654 B2 | 1/2006 | Carroll, Jr. | |
| 7,027,463 B2 | 4/2006 | Mathew | |
| 7,032,210 B2 | 4/2006 | Alloing | |
| 7,039,596 B1 | 5/2006 | Lu | |
| 7,044,363 B2* | 5/2006 | Silverbrook et al. | 235/375 |
| 7,046,848 B1 | 5/2006 | Olcott | |
| 7,069,538 B1 | 6/2006 | Renshaw | |
| 7,107,544 B1 | 9/2006 | Luke | |
| 7,110,936 B2 | 9/2006 | Hiew | |
| 7,111,238 B1 | 9/2006 | Kuppusamy | |
| 7,117,370 B2 | 10/2006 | Khan | |
| 7,134,095 B1 | 11/2006 | Smith et al. | |
| 7,149,983 B1 | 12/2006 | Robertson | |
| 7,152,207 B1 | 12/2006 | Underwood | |
| 7,181,697 B2 | 2/2007 | Tai | |
| 7,188,073 B1 | 3/2007 | Tam | |
| 7,188,317 B1 | 3/2007 | Hazel | |
| 7,200,636 B2 | 4/2007 | Harding | |
| 7,206,813 B2 | 4/2007 | Dunbar | |
| 7,206,814 B2 | 4/2007 | Kirsch | |
| 7,212,208 B2 | 5/2007 | Khozai | |
| 7,216,301 B2 | 5/2007 | Moehrle | |
| 7,219,305 B2 | 5/2007 | Jennings | |
| 7,240,323 B1 | 7/2007 | Desai | |
| 7,249,325 B1 | 7/2007 | Donaldson | |
| 7,251,640 B2 | 7/2007 | Baumard | |
| 7,263,668 B1 | 8/2007 | Lentz | |
| 7,290,033 B1 | 10/2007 | Goldman | |
| 7,296,241 B2 | 11/2007 | Oshiro et al. | |
| 7,325,204 B2 | 1/2008 | Rogers | |
| 7,328,409 B2 | 2/2008 | Awada | |
| 7,337,185 B2 | 2/2008 | Ellis | |
| 7,346,705 B2 | 3/2008 | Hullot | |
| 7,346,769 B2 | 3/2008 | Forlenza | |
| 7,356,772 B2 | 4/2008 | Brownholtz et al. | |
| 7,360,174 B2 | 4/2008 | Grossman | |
| 7,370,282 B2 | 5/2008 | Cary | |
| 7,386,535 B1 | 6/2008 | Kalucha | |
| 7,386,835 B1 | 6/2008 | Desai | |
| 7,392,249 B1 | 6/2008 | Harris | |
| 7,395,221 B2 | 7/2008 | Doss | |
| 7,395,500 B2 | 7/2008 | Whittle | |
| 7,421,660 B2 | 9/2008 | Charnock | |
| 7,421,690 B2 | 9/2008 | Forstall | |
| 7,426,713 B2 | 9/2008 | Duggan et al. | |
| 7,461,077 B1 | 12/2008 | Greenwood | |
| 7,464,343 B2* | 12/2008 | Shaw et al. | 715/850 |
| 7,469,385 B2 | 12/2008 | Harper | |
| 7,472,117 B2 | 12/2008 | Dettinger | |
| 7,484,213 B2 | 1/2009 | Mathew et al. | |
| 7,499,907 B2 | 3/2009 | Brown | |
| 7,505,954 B2 | 3/2009 | Heidloff | |
| 7,530,029 B2 | 5/2009 | Satterfield | |
| 7,555,707 B1 | 6/2009 | Labarge | |
| 7,565,403 B2 | 7/2009 | Horvitz et al. | |
| 7,567,964 B2 | 7/2009 | Brice | |
| 7,584,253 B2 | 9/2009 | Curbow et al. | |
| 7,627,561 B2 | 12/2009 | Pell | |
| 7,664,821 B1 | 2/2010 | Ancin et al. | |
| 7,703,036 B2* | 4/2010 | Satterfield et al. | 715/777 |
| 7,707,255 B2 | 4/2010 | Satterfield | |
| 7,711,742 B2 | 5/2010 | Bennett | |
| 7,716,593 B2 | 5/2010 | Durazo | |
| 7,739,259 B2 | 6/2010 | Hartwell | |
| 7,747,966 B2 | 6/2010 | Leukart | |
| 7,788,598 B2 | 8/2010 | Bansal | |
| 7,802,199 B2 | 9/2010 | Shneerson | |
| 7,831,902 B2 | 11/2010 | Sourov et al. | |
| 7,853,877 B2 | 12/2010 | Giesen | |
| 7,865,868 B2 | 1/2011 | Falzone Schaw | |
| 7,870,465 B2 | 1/2011 | VerSteeg | |
| 7,886,290 B2 | 2/2011 | Dhanjal | |
| 7,895,531 B2 | 2/2011 | Radtke | |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 8,239,882 B2 | 8/2012 | Dhanjal et al. | |
| 8,255,828 B2* | 8/2012 | Harris et al. | 715/810 |
| 8,285,806 B2 | 10/2012 | Yu | |
| 8,402,096 B2 | 3/2013 | Affronti et al. | |
| 8,484,578 B2 | 7/2013 | Dukhon et al. | |
| 8,605,090 B2 | 12/2013 | Garg et al. | |
| 8,627,222 B2 | 1/2014 | Hartwell et al. | |
| 8,638,333 B2 | 1/2014 | Garg et al. | |
| 8,689,137 B2 | 4/2014 | McCormack et al. | |
| 8,762,880 B2 | 6/2014 | Dukhon et al. | |
| 8,799,808 B2 | 8/2014 | Satterfield et al. | |
| 8,839,139 B2* | 9/2014 | Leukart et al. | 715/779 |
| 2001/0032220 A1 | 10/2001 | Ven Hoff | |
| 2001/0034762 A1 | 10/2001 | Jacobs et al. | |
| 2001/0035882 A1 | 11/2001 | Stoakley | |
| 2001/0038395 A1 | 11/2001 | Holtzblatt et al. | |
| 2001/0040627 A1 | 11/2001 | Obradovich | |
| 2001/0044736 A1 | 11/2001 | Jacobs et al. | |
| 2001/0044741 A1 | 11/2001 | Jacobs et al. | |
| 2001/0049677 A1 | 12/2001 | Talib et al. | |
| 2002/0007380 A1 | 1/2002 | Bauchot | |
| 2002/0029247 A1 | 3/2002 | Kawamoto | |
| 2002/0037754 A1 | 3/2002 | Hama | |
| 2002/0052721 A1 | 5/2002 | Ruff | |
| 2002/0052880 A1 | 5/2002 | Fruensgaard | |
| 2002/0052916 A1 | 5/2002 | Kloba et al. | |
| 2002/0054101 A1 | 5/2002 | Beatty | |
| 2002/0054128 A1 | 5/2002 | Lau et al. | |
| 2002/0063734 A1* | 5/2002 | Khalfay et al. | 345/744 |
| 2002/0070977 A1 | 6/2002 | Morcos | |
| 2002/0073091 A1* | 6/2002 | Jain et al. | 707/100 |
| 2002/0073156 A1 | 6/2002 | Newman | |
| 2002/0075330 A1 | 6/2002 | Rosenzweig | |
| 2002/0078143 A1 | 6/2002 | DeBoor | |
| 2002/0083054 A1 | 6/2002 | Peltonen | |
| 2002/0089543 A1 | 7/2002 | Ostergaard et al. | |
| 2002/0091697 A1 | 7/2002 | Huang | |
| 2002/0091739 A1 | 7/2002 | Ferlitsch | |
| 2002/0097266 A1 | 7/2002 | Hachiya et al. | |
| 2002/0099775 A1 | 7/2002 | Gupta et al. | |

(56) References Cited

U.S. PATENT DOCUMENTS

| | | |
|---|---|---|
| 2002/0116508 A1 | 8/2002 | Khan |
| 2002/0122071 A1 | 9/2002 | Camara |
| 2002/0123984 A1 | 9/2002 | Prakash |
| 2002/0129052 A1* | 9/2002 | Glazer et al. ............... 707/501.1 |
| 2002/0133557 A1 | 9/2002 | Winarski |
| 2002/0135621 A1 | 9/2002 | Angiulo |
| 2002/0140731 A1 | 10/2002 | Subramaniam |
| 2002/0140740 A1* | 10/2002 | Chen ............................ 345/810 |
| 2002/0149623 A1 | 10/2002 | West |
| 2002/0149629 A1 | 10/2002 | Craycroft |
| 2002/0154178 A1 | 10/2002 | Barnett |
| 2002/0158876 A1 | 10/2002 | Janssen |
| 2002/0163538 A1 | 11/2002 | Shteyn |
| 2002/0175938 A1 | 11/2002 | Hackworth |
| 2002/0175955 A1 | 11/2002 | Gourdol |
| 2002/0186257 A1 | 12/2002 | Cadiz et al. .................. 715/764 |
| 2002/0188515 A1 | 12/2002 | Nakata et al. |
| 2002/0196293 A1 | 12/2002 | Suppan |
| 2003/0005051 A1 | 1/2003 | Gottlieb |
| 2003/0005056 A1 | 1/2003 | Yamamoto et al. |
| 2003/0009455 A1 | 1/2003 | Carlson |
| 2003/0011564 A1 | 1/2003 | Ushino et al. |
| 2003/0011638 A1 | 1/2003 | Chung |
| 2003/0011639 A1 | 1/2003 | Webb |
| 2003/0014421 A1 | 1/2003 | Jung |
| 2003/0014490 A1 | 1/2003 | Bates |
| 2003/0016248 A1 | 1/2003 | Hayes Ubillos |
| 2003/0022700 A1 | 1/2003 | Wang |
| 2003/0025732 A1 | 2/2003 | Prichard |
| 2003/0025737 A1 | 2/2003 | Breinberg |
| 2003/0028560 A1 | 2/2003 | Kudrolli et al. |
| 2003/0035917 A1 | 2/2003 | Hyman |
| 2003/0038832 A1 | 2/2003 | Sobol |
| 2003/0043200 A1 | 3/2003 | Faieta |
| 2003/0043211 A1 | 3/2003 | Kremer |
| 2003/0046528 A1 | 3/2003 | Haitani |
| 2003/0050986 A1 | 3/2003 | Matthews et al. |
| 2003/0066025 A1 | 4/2003 | Garner |
| 2003/0069892 A1 | 4/2003 | Hind et al. |
| 2003/0069900 A1 | 4/2003 | Hind et al. |
| 2003/0070143 A1 | 4/2003 | Maslov |
| 2003/0084035 A1 | 5/2003 | Emerick |
| 2003/0093490 A1 | 5/2003 | Yamamoto |
| 2003/0097361 A1 | 5/2003 | Huang |
| 2003/0097640 A1 | 5/2003 | Abrams |
| 2003/0098891 A1 | 5/2003 | Molander |
| 2003/0106024 A1* | 6/2003 | Silverbrook et al. ......... 715/515 |
| 2003/0110191 A1 | 6/2003 | Handsaker |
| 2003/0112278 A1 | 6/2003 | Driskell |
| 2003/0132972 A1 | 7/2003 | Pang |
| 2003/0135825 A1 | 7/2003 | Gertner |
| 2003/0154254 A1 | 8/2003 | Awasthi |
| 2003/0156140 A1 | 8/2003 | Watanabe |
| 2003/0160821 A1 | 8/2003 | Yoon |
| 2003/0163455 A1 | 8/2003 | Dettinger |
| 2003/0163537 A1 | 8/2003 | Rohall et al. |
| 2003/0167310 A1 | 9/2003 | Moody |
| 2003/0169284 A1 | 9/2003 | Dettinger |
| 2003/0177190 A1 | 9/2003 | Moody et al. |
| 2003/0187586 A1 | 10/2003 | Katzenmaier et al. |
| 2003/0195937 A1 | 10/2003 | Kircher |
| 2003/0200267 A1 | 10/2003 | Garrigues |
| 2003/0206646 A1 | 11/2003 | Brackett |
| 2003/0218611 A1 | 11/2003 | Ben-Tovim |
| 2003/0220138 A1 | 11/2003 | Walker et al. |
| 2003/0226106 A1 | 12/2003 | McKellar |
| 2003/0227487 A1 | 12/2003 | Hugh |
| 2003/0229668 A1 | 12/2003 | Malik |
| 2003/0229673 A1 | 12/2003 | Malik |
| 2003/0233419 A1 | 12/2003 | Beringer |
| 2004/0002941 A1 | 1/2004 | Thorne et al. |
| 2004/0003351 A1 | 1/2004 | Sommerer |
| 2004/0006570 A1 | 1/2004 | Gelb |
| 2004/0010513 A1 | 1/2004 | Scherr et al. |
| 2004/0012633 A1 | 1/2004 | Helt |
| 2004/0021647 A1 | 2/2004 | Iwema et al. |
| 2004/0024824 A1 | 2/2004 | Ferguson et al. |
| 2004/0030993 A1 | 2/2004 | Hong Huey |
| 2004/0056894 A1 | 3/2004 | Zaika |
| 2004/0061713 A1* | 4/2004 | Jennings ..................... 345/700 |
| 2004/0068695 A1* | 4/2004 | Daniell et al. ............... 715/513 |
| 2004/0073503 A1 | 4/2004 | Morales et al. |
| 2004/0083432 A1 | 4/2004 | Kawamura et al. |
| 2004/0088359 A1 | 5/2004 | Simpson |
| 2004/0090315 A1 | 5/2004 | Mackjust |
| 2004/0093290 A1 | 5/2004 | Doss et al. |
| 2004/0100504 A1 | 5/2004 | Sommer |
| 2004/0100505 A1 | 5/2004 | Cazier |
| 2004/0107197 A1 | 6/2004 | Shen |
| 2004/0109025 A1 | 6/2004 | Hullot |
| 2004/0109033 A1 | 6/2004 | Vienneau |
| 2004/0117451 A1 | 6/2004 | Chung |
| 2004/0119755 A1 | 6/2004 | Guibourge |
| 2004/0119760 A1 | 6/2004 | Grossman |
| 2004/0122789 A1 | 6/2004 | Ostertag |
| 2004/0125142 A1 | 7/2004 | Mock |
| 2004/0128275 A1 | 7/2004 | Moehrle |
| 2004/0133854 A1 | 7/2004 | Black |
| 2004/0135811 A1 | 7/2004 | Pickering et al. |
| 2004/0142720 A1 | 7/2004 | Smethers |
| 2004/0153968 A1 | 8/2004 | Ching |
| 2004/0153973 A1 | 8/2004 | Horwitz |
| 2004/0164983 A1 | 8/2004 | Khozai |
| 2004/0168153 A1 | 8/2004 | Marvin |
| 2004/0186775 A1 | 9/2004 | Margiloff |
| 2004/0189694 A1 | 9/2004 | Kurtz |
| 2004/0192440 A1 | 9/2004 | Evans |
| 2004/0205536 A1 | 10/2004 | Newman et al. |
| 2004/0212640 A1 | 10/2004 | Mann |
| 2004/0215612 A1 | 10/2004 | Brody |
| 2004/0221234 A1 | 11/2004 | Imai |
| 2004/0221309 A1* | 11/2004 | Zaner et al. ..................... 725/46 |
| 2004/0230508 A1 | 11/2004 | Minnis |
| 2004/0230906 A1 | 11/2004 | Pik |
| 2004/0236796 A1 | 11/2004 | Bhatt et al. |
| 2004/0239700 A1 | 12/2004 | Baschy |
| 2004/0243938 A1 | 12/2004 | Weise |
| 2004/0260756 A1 | 12/2004 | Forstall et al. |
| 2004/0261013 A1 | 12/2004 | Wynn |
| 2004/0268231 A1 | 12/2004 | Tunning |
| 2004/0268235 A1 | 12/2004 | Wason |
| 2004/0268270 A1 | 12/2004 | Hill |
| 2005/0004989 A1 | 1/2005 | Satterfield |
| 2005/0004990 A1 | 1/2005 | Durazo |
| 2005/0005235 A1 | 1/2005 | Satterfield |
| 2005/0005249 A1 | 1/2005 | Hill |
| 2005/0010871 A1 | 1/2005 | Ruthfield |
| 2005/0015361 A1 | 1/2005 | Payton et al. |
| 2005/0021504 A1 | 1/2005 | Atchison |
| 2005/0021521 A1 | 1/2005 | Wycoff |
| 2005/0022116 A1 | 1/2005 | Bowman |
| 2005/0033614 A1 | 2/2005 | Lettovsky |
| 2005/0039142 A1 | 2/2005 | Jalon |
| 2005/0043015 A1 | 2/2005 | Muramatsu |
| 2005/0044500 A1 | 2/2005 | Orimoto |
| 2005/0055449 A1 | 3/2005 | Rappold, III |
| 2005/0057584 A1 | 3/2005 | Gruen |
| 2005/0060337 A1 | 3/2005 | Chou et al. |
| 2005/0071242 A1 | 3/2005 | Allen et al. |
| 2005/0086135 A1 | 4/2005 | Lu |
| 2005/0091576 A1 | 4/2005 | Relyea |
| 2005/0097465 A1 | 5/2005 | Giesen |
| 2005/0108348 A1 | 5/2005 | Lee |
| 2005/0114778 A1 | 5/2005 | Branson |
| 2005/0117179 A1 | 6/2005 | Ito |
| 2005/0132010 A1 | 6/2005 | Muller |
| 2005/0132053 A1 | 6/2005 | Roth et al. |
| 2005/0138576 A1 | 6/2005 | Baumert |
| 2005/0144241 A1 | 6/2005 | Stata |
| 2005/0144284 A1* | 6/2005 | Ludwig et al. ............... 709/226 |
| 2005/0144560 A1 | 6/2005 | Gruen et al. |
| 2005/0144568 A1 | 6/2005 | Gruen et al. |
| 2005/0172262 A1 | 8/2005 | Lalwani |
| 2005/0177789 A1 | 8/2005 | Abbar et al. |

(56) References Cited

U.S. PATENT DOCUMENTS

| | | |
|---|---|---|
| 2005/0183008 A1 | 8/2005 | Crider |
| 2005/0185920 A1 | 8/2005 | Harper et al. |
| 2005/0203975 A1 | 9/2005 | Jindal |
| 2005/0216863 A1 | 9/2005 | Schumacher |
| 2005/0223057 A1 | 10/2005 | Buchheit et al. |
| 2005/0223066 A1 | 10/2005 | Buchheit et al. |
| 2005/0223329 A1 | 10/2005 | Schwartz |
| 2005/0234910 A1 | 10/2005 | Buchheit |
| 2005/0240902 A1 | 10/2005 | Bunker et al. |
| 2005/0251757 A1 | 11/2005 | Farn |
| 2005/0256867 A1 | 11/2005 | Walther |
| 2005/0278656 A1 | 12/2005 | Goldthwaite |
| 2005/0289109 A1* | 12/2005 | Arrouye et al. .................. 707/1 |
| 2005/0289156 A1 | 12/2005 | Maryka |
| 2005/0289158 A1 | 12/2005 | Weiss |
| 2006/0015816 A1 | 1/2006 | Kuehner |
| 2006/0020962 A1 | 1/2006 | Stark |
| 2006/0026033 A1 | 2/2006 | Brydon |
| 2006/0026145 A1* | 2/2006 | Beringer et al. ................. 707/3 |
| 2006/0026213 A1 | 2/2006 | Yaskin |
| 2006/0026242 A1 | 2/2006 | Kuhlmann |
| 2006/0036580 A1 | 2/2006 | Stata |
| 2006/0036945 A1 | 2/2006 | Radtke |
| 2006/0036946 A1* | 2/2006 | Radtke et al. ................. 715/711 |
| 2006/0036950 A1* | 2/2006 | Himberger et al. ........... 715/732 |
| 2006/0036964 A1* | 2/2006 | Satterfield et al. ............ 715/777 |
| 2006/0036965 A1* | 2/2006 | Harris et al. .................. 715/777 |
| 2006/0041545 A1 | 2/2006 | Heidloff |
| 2006/0047644 A1 | 3/2006 | Bocking |
| 2006/0053383 A1 | 3/2006 | Gauthier et al. |
| 2006/0064434 A1* | 3/2006 | Gilbert et al. ............. 707/104.1 |
| 2006/0069604 A1 | 3/2006 | Leukart |
| 2006/0069686 A1 | 3/2006 | Beyda |
| 2006/0074844 A1* | 4/2006 | Frankel et al. .................... 707/1 |
| 2006/0080303 A1 | 4/2006 | Sargent |
| 2006/0085502 A1 | 4/2006 | Sundararajan et al. |
| 2006/0095865 A1 | 5/2006 | Rostom |
| 2006/0101051 A1 | 5/2006 | Carr |
| 2006/0101350 A1 | 5/2006 | Scott |
| 2006/0111931 A1 | 5/2006 | Johnson |
| 2006/0117249 A1 | 6/2006 | Hu |
| 2006/0117302 A1 | 6/2006 | Mercer |
| 2006/0129937 A1 | 6/2006 | Shafron |
| 2006/0132812 A1 | 6/2006 | Barnes et al. |
| 2006/0155689 A1 | 7/2006 | Blakeley |
| 2006/0161849 A1 | 7/2006 | Miller et al. |
| 2006/0161863 A1 | 7/2006 | Gallo |
| 2006/0168522 A1 | 7/2006 | Bala |
| 2006/0173824 A1 | 8/2006 | Bensky |
| 2006/0173961 A1 | 8/2006 | Turski et al. |
| 2006/0200455 A1* | 9/2006 | Wilson ............................. 707/4 |
| 2006/0218500 A1 | 9/2006 | Sauve |
| 2006/0242557 A1 | 10/2006 | Nortis III |
| 2006/0242575 A1 | 10/2006 | Winser |
| 2006/0248012 A1 | 11/2006 | Kircher |
| 2006/0259449 A1 | 11/2006 | Betz |
| 2006/0271869 A1* | 11/2006 | Thanu et al. .................. 715/764 |
| 2006/0271910 A1 | 11/2006 | Burcham |
| 2006/0282817 A1 | 12/2006 | Darst |
| 2006/0294452 A1 | 12/2006 | Matsumoto |
| 2006/0294526 A1 | 12/2006 | Hambrick |
| 2007/0006206 A1 | 1/2007 | Dhanjal |
| 2007/0011258 A1 | 1/2007 | Khoo |
| 2007/0033250 A1 | 2/2007 | Levin et al. |
| 2007/0050182 A1 | 3/2007 | Sneddon et al. |
| 2007/0050401 A1 | 3/2007 | Young |
| 2007/0055936 A1* | 3/2007 | Dhanjal et al. ................ 715/700 |
| 2007/0055943 A1* | 3/2007 | McCormack et al. ........ 715/746 |
| 2007/0061306 A1 | 3/2007 | Pell |
| 2007/0061307 A1 | 3/2007 | Hartwell |
| 2007/0061308 A1 | 3/2007 | Hartwell |
| 2007/0061738 A1 | 3/2007 | Taboada et al. |
| 2007/0094230 A1 | 4/2007 | Subramaniam et al. |
| 2007/0101299 A1* | 5/2007 | Shaw et al. ................... 715/853 |
| 2007/0106951 A1 | 5/2007 | McCormack |
| 2007/0124696 A1* | 5/2007 | Mullender et al. ............ 715/781 |
| 2007/0130276 A1 | 6/2007 | Zhang et al. |
| 2007/0143662 A1 | 6/2007 | Carlson |
| 2007/0143671 A1 | 6/2007 | Paterson |
| 2007/0180040 A1 | 8/2007 | Etgen et al. |
| 2007/0185826 A1 | 8/2007 | Brice |
| 2007/0203991 A1 | 8/2007 | Fisher et al. |
| 2007/0240057 A1* | 10/2007 | Satterfield et al. ............ 715/705 |
| 2007/0260996 A1 | 11/2007 | Jakobson |
| 2007/0266017 A1 | 11/2007 | Held et al. |
| 2007/0279417 A1 | 12/2007 | Garg |
| 2007/0282956 A1 | 12/2007 | Staats |
| 2007/0300168 A1 | 12/2007 | Bosma |
| 2008/0005247 A9 | 1/2008 | Khoo |
| 2008/0005686 A1 | 1/2008 | Singh |
| 2008/0034304 A1 | 2/2008 | Feuerbacher |
| 2008/0040682 A1 | 2/2008 | Sorenson |
| 2008/0052670 A1 | 2/2008 | Espinosa |
| 2008/0077571 A1 | 3/2008 | Harris |
| 2008/0098229 A1* | 4/2008 | Hartrell et al. ................ 713/176 |
| 2008/0104505 A1 | 5/2008 | Keohane et al. |
| 2008/0109787 A1* | 5/2008 | Wang et al. ................... 717/113 |
| 2008/0134138 A1 | 6/2008 | Chamieh |
| 2008/0141242 A1 | 6/2008 | Shapiro |
| 2008/0155555 A1 | 6/2008 | Kwong |
| 2008/0168146 A1 | 7/2008 | Fletcher |
| 2008/0178110 A1 | 7/2008 | Hill |
| 2008/0216014 A1* | 9/2008 | Kurtenbach et al. .......... 715/808 |
| 2008/0244440 A1* | 10/2008 | Bailey et al. .................. 715/777 |
| 2009/0007003 A1 | 1/2009 | Dukhon |
| 2009/0012984 A1 | 1/2009 | Ravid et al. |
| 2009/0083656 A1 | 3/2009 | Dukhon |
| 2009/0100009 A1 | 4/2009 | Karp |
| 2009/0106375 A1 | 4/2009 | Carmel et al. |
| 2009/0144651 A1* | 6/2009 | Sprang et al. ................. 715/800 |
| 2009/0152349 A1 | 6/2009 | Bonev et al. |
| 2009/0158173 A1 | 6/2009 | Palahnuk et al. |
| 2009/0192845 A1* | 7/2009 | Gudipaty et al. ................. 705/7 |
| 2009/0217192 A1 | 8/2009 | Dean |
| 2009/0222763 A1 | 9/2009 | Dukhon |
| 2009/0319619 A1 | 12/2009 | Affronti |
| 2009/0319911 A1 | 12/2009 | McCann |
| 2010/0011310 A1 | 1/2010 | Rainisto |
| 2010/0060645 A1 | 3/2010 | Garg |
| 2010/0159967 A1 | 6/2010 | Pounds et al. |
| 2010/0180226 A1 | 7/2010 | Satterfield |
| 2010/0191818 A1 | 7/2010 | Satterfield |
| 2010/0199261 A1 | 8/2010 | Shenfield et al. |
| 2010/0211889 A1 | 8/2010 | Durazo |
| 2010/0223575 A1 | 9/2010 | Leukart |
| 2010/0293470 A1* | 11/2010 | Zhao et al. .................... 715/732 |
| 2011/0072396 A1 | 3/2011 | Giesen et al. ................. 715/841 |
| 2011/0138273 A1 | 6/2011 | Radtke et al. |
| 2011/0225249 A1 | 9/2011 | Forstall et al. |
| 2011/0296322 A1* | 12/2011 | Dhanjal et al. ................ 715/760 |
| 2012/0179993 A1* | 7/2012 | Himberger et al. ........... 715/777 |
| 2012/0215866 A1 | 8/2012 | Satterfield et al. |
| 2012/0324394 A1 | 12/2012 | Harris et al. |
| 2013/0014048 A1* | 1/2013 | Satterfield et al. ............ 715/777 |
| 2013/0159879 A1 | 6/2013 | Affronti et al. |
| 2013/0283207 A1* | 10/2013 | Dukhon et al. ................ 715/808 |
| 2014/0115526 A1* | 4/2014 | Hartwell et al. ............... 715/780 |
| 2014/0132609 A1* | 5/2014 | Garg et al. ..................... 345/440 |
| 2014/0258933 A1 | 9/2014 | Dukhon et al. |

FOREIGN PATENT DOCUMENTS

| | | |
|---|---|---|
| CA | 2 650 016 | 9/2014 |
| CN | 1553377 | 12/2004 |
| CN | 1746914 | 3/2006 |
| CN | 1755599 A | 4/2006 |
| CN | 101243439 | 6/2012 |
| CN | 102067166 B | 6/2013 |
| CN | 102317897 B | 7/2013 |
| CN | 102077163 B | 10/2013 |
| CN | 102077199 B | 1/2014 |
| CN | 201080021957 | 11/2014 |
| EP | 0 584 269 B1 | 3/1994 |
| EP | 0 910 007 | 4/1999 |

(56) References Cited

FOREIGN PATENT DOCUMENTS

| | | |
|---|---|---|
| EP | 1 077 405 A2 | 2/2001 |
| EP | 1 104 151 | 5/2001 |
| EP | 1 672 518 | 6/2001 |
| EP | 1 223 503 | 7/2002 |
| EP | 1 376 337 | 2/2004 |
| EP | 1 462 999 A2 | 9/2004 |
| EP | 1 542 133 A2 | 6/2005 |
| EP | 1564652 | 8/2005 |
| EP | 1628197 | 2/2006 |
| EP | 1628198 | 2/2006 |
| EP | 1628199 | 2/2006 |
| EP | 1645972 | 4/2006 |
| EP | 1 835 434 A1 | 9/2007 |
| EP | 1915001 | 4/2008 |
| GB | 2329813 | 3/1999 |
| GB | 2 391 148 | 1/2004 |
| ID | P 0027717 | 3/2011 |
| ID | P 0027754 | 3/2011 |
| ID | P0029297 | 10/2011 |
| JP | 03-043824 | 2/1991 |
| JP | 04-186425 | 7/1992 |
| JP | 04-312186 | 11/1992 |
| JP | 05-204579 | 8/1993 |
| JP | 06-052282 | 2/1994 |
| JP | 06-342357 | 12/1994 |
| JP | 09-204289 | 8/1997 |
| JP | 10-074217 | 3/1998 |
| JP | 10-326171 | 12/1998 |
| JP | 11-039292 | 2/1999 |
| JP | 11-175258 | 7/1999 |
| JP | 11-259200 | 9/1999 |
| JP | 2001-034775 | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-526820 | 9/2003 |
| JP | 2003-308145 | 10/2003 |
| JP | 2004-078512 | 3/2004 |
| JP | 2004-086893 | 3/2004 |
| JP | 2004-102803 | 4/2004 |
| JP | 2004-512578 | 4/2004 |
| JP | 2004-145569 | 5/2004 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-025550 | 1/2005 |
| JP | 2005-31995 | 2/2005 |
| JP | 2005-032041 | 2/2005 |
| JP | 2005-182353 | 7/2005 |
| JP | 2005-236089 | 9/2005 |
| JP | 2005-352849 | 12/2005 |
| JP | 2006-059358 | 3/2006 |
| JP | 2007-280180 | 10/2007 |
| JP | 2007-531165 | 11/2007 |
| JP | 2008-047067 | 2/2008 |
| JP | 2008-117019 | 5/2008 |
| JP | 2009-507311 | 2/2009 |
| JP | 4832024 | 9/2011 |
| JP | 5021185 | 6/2012 |
| JP | 5079701 | 9/2012 |
| JP | 5139984 | 11/2012 |
| JP | 5190452 | 2/2013 |
| JP | 5193042 | 2/2013 |
| JP | 5221757 | 3/2013 |
| JP | 5266384 | 5/2013 |
| JP | 5480894 | 2/2014 |
| JP | 5486595 | 2/2014 |
| JP | 5559817 | 6/2014 |
| JP | 5559845 | 6/2014 |
| JP | 5597698 | 8/2014 |
| KR | 10-2003-0070685 | 2/2003 |
| KR | 10-2005-0023805 A | 3/2005 |
| KR | 10-2005-0036702 A | 4/2005 |
| KR | 10-1130421 | 3/2012 |
| KR | 10-1149960 | 5/2012 |
| KR | 10-1149990 | 5/2012 |
| KR | 10-1159334 | 6/2012 |
| KR | 10-123859 | 2/2013 |
| KR | 10-1298338 | 8/2013 |
| KR | 10-1298461 | 8/2013 |
| KR | 10-1312867 | 9/2013 |
| KR | 10-1323011 | 10/2013 |
| MX | 315932 | 12/2013 |
| MX | 322458 | 4/2014 |
| MY | 146456 | 8/2012 |
| MY | 147334 | 7/2013 |
| MY | 149803 | 10/2013 |
| PH | 1-2005-000404 | 8/2011 |
| PH | 1-2005-000495 | 3/2014 |
| PH | 1-2008-500356 | 8/2014 |
| RU | 2001-122576 A | 9/2003 |
| RU | 2005-116667 | 11/2006 |
| RU | 2005/120362 | 1/2007 |
| RU | 2005-130357 | 4/2007 |
| RU | 2322687 | 4/2008 |
| RU | 2327205 C2 | 6/2008 |
| RU | 2328034 | 6/2008 |
| RU | 2332728 C2 | 8/2008 |
| RU | 2537776 | 1/2015 |
| TW | 420953 | 2/2001 |
| TW | 460839 | 10/2001 |
| TW | 490652 | 6/2002 |
| TW | 2003-05097 | 10/2003 |
| TW | 1254878 | 5/2006 |
| TW | 2008-14632 | 3/2008 |
| TW | I368852 | 7/2012 |
| TW | I389002 | 3/2013 |
| TW | I389043 | 3/2013 |
| TW | I401577 | 7/2013 |
| WO | 92/21091 | 11/1992 |
| WO | 94/20921 | 9/1994 |
| WO | 96/10231 | 4/1996 |
| WO | 96/39654 | 12/1996 |
| WO | 98/20410 | 5/1998 |
| WO | WO 99/04353 A1 | 1/1999 |
| WO | WO 99/27495 | 6/1999 |
| WO | 01/55894 | 8/2001 |
| WO | WO 02/091162 A3 | 11/2002 |
| WO | WO 03/003240 A2 | 1/2003 |
| WO | WO 03/098500 | 11/2003 |
| WO | 2007/030727 A3 | 3/2007 |
| WO | WO 2007/033159 A1 | 3/2007 |
| WO | WO 2007/027737 A1 | 8/2007 |
| WO | 2008/027477 | 3/2008 |
| WO | WO 2008-121718 A1 | 10/2008 |
| WO | 2009-158151 | 12/2009 |
| WO | 2009-158171 | 12/2009 |
| WO | 2009-158172 | 12/2009 |
| ZA | 2010/07809 | 2/2012 |
| ZA | 2010/07810 | 2/2012 |
| ZA | 2010/07875 | 2/2012 |
| ZA | 2011/04850 | 12/2012 |

OTHER PUBLICATIONS

Working screenshot of Office 2007, Microsoft, released on Nov. 6, 2006, 23 pages.*

Office 2007, Microsoft, released on Nov. 6, 2006, 23 pages.*

International Search Report and Written Opinion issued in PCT/US2010/034277 mailed Nov. 29, 2011 (Non-M&G 326876-02).

"The New "Office 2007" User Interface," Microsoft Corporation © 2005, 32 pages.

"The New Look in Office 12 / Office 2007," OFFICE Watch, posted Sep. 20, 2005, 9 pages.

Atwood, Jeff, "Sometimes a Word is Worth a Thousand Icons," Coding Honor, Feb. 22, 2006, 9 pages.

(56) References Cited

OTHER PUBLICATIONS

U.S. Appl. No. 11/154,278, filed Jun. 16, 2005 entitled "Cross Version and Cross Product User Interface Compatibility".
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/607,020, filed Jun. 26, 2003 entitled "Side-by-Side Shared Calendars".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/848,774, filed May 19, 2004 entitled "Automatic Grouping of Electronic Mail".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".
U.S. Appl. No. 10/955,942, filed Sep. 30, 2004 entitled "An Improved User Interface for Displaying a Gallery of Formatting Options Applicable to a Selected Object".
U.S. Appl. No. 10/955,928, filed Sep. 30, 2004 entitled "User Interface for Providing Task Management and Calendar Information".
U.S. Appl. No. 10/800,056, filed Mar. 12, 2004 entitled "Method and System for Data Binding in a Block Structured User Interface Scripting Language".
U.S. Appl. No. 12/372,386, filed Feb. 17, 2009 entitled "Command User Interface for Displaying Multiple Sections of Software Functionality Controls".
U.S. Appl. No. 12/163,758, filed Jun. 27, 2008 entitled "Communication Between a Document Editor-in-Space User Interface and a Document Editor Out-Space User Interface".
U.S. Appl. No. 12/163,784, filed Jun. 27, 2008 entitled "Exposing Non-Authoring Features Through Document Status Information in an Out-Space User Interface".
U.S. Appl. No. 11/445,393, filed Jun. 1, 2006 entitled "Modifying a Chart".
U.S. Appl. No. 12/028,797, filed Feb. 11, 2008 entitled "Side-by-Side Shared Calendars".
U.S. Appl. No. 12/574,256, filed Oct. 6, 2009 entitled "Modifying a Chart".
U.S. Appl. No. 11/430,561, filed May 9, 2006 entitled "Integrated Search and Find User Interface".
U.S. Appl. No. 11/430,562, filed May 9, 2006 entitled "Expanded Search and Find User Interface".
U.S. Appl. No. 11/430,416, filed May 9, 2006 entitled "Search and Find Using Expanded Search Scope".
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
U.S. Appl. No. 12/954,952, filed Nov. 29, 2010 entitled "Gallery User Interface Controls".
U.S. Appl. No. 13/027,289, filed Feb. 15, 2011 entitled "Floating Command Object".
U.S. Appl. No. 12/464,584, filed May 12, 2009 entitled "Hierarchically-Organized Control Galleries".
Charles Rich, "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach, "The Hotbox: Efficient Access to a Large Number of Menu-items," ACM, 1999, pp. 231-237, May 1999.
Charles Rich, "Adding a Collaborative Agent to Graphical User Interfaces," 1996, ACM, pp. 21-30.
Boyce et al.; "Microsoft Outlook Inside Out," 2001, pp. 67, 68, 109, 110, 230, 231, 310, 316-318, 798.
Halvorson et al.; "Microsoft Office XP Inside Out," 2001, pp. 1005-1009, 1015, 1023-1028, 1036-1039, 1093.
Riggsby et al.; "Mastering Lotus Notes and Domino 6," 2003, pp. 135-139.
Riggsby et al.; "Mastering Lotus Notes and Domino 6," 2003, pp. 135-138, 607-612.
Khare et al.;"The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman et al.; "Cascaded Speech Style Sheets," 1997, 7 pgs.
"Primary Windows," Accessed at http://www-03.ibm.com/servers/eserver/iseries/navigator/guidelines/primary.html on Feb. 23, 2007, 23 pgs.
Schumaker, "User Interface Standards," http://msdn2.microsoft.com/en-us/library/aa217660(office.11.d=printer).aspx, Sep. 2001, 5 pgs.
Budinsky et al.; "WebSphere Studio Overview," http://researchweb.watson.ibm.com/journal/sj/432/budinsky.html, May 6, 2004, 25 pgs.
Gordon Padwick; Using Microsoft Outlook 2000, Que, Sp. Ed., May 1999, 5 pp.
Becker et al.; "Virtual Folders: Database Support for Electronic Messages Classification," Pontificia Universidade Catolica do Rio Grande do Sul, Porto Alegre, Brazil, pp. 163-170.
Goldberg et al.; "Using Collaborative Filtering to Weave an Information Tapestry," Communication of the ACM, vol. 35, No. 12, pp. 61-70, Dec. 1992.
Liu et al.; "Continual Queries for Internet Scale Event-Driven Information Delivery," IEEE Transactions on Knowledge and Data Engineering, vol. 11, Issue 1, pp. 610-628, 1999.
Chen et al.; "NiagaraCQ: A Scalable Continuous Query System for Internet Databases," Int. Conf. on Management of Data, Proc. of the 2000 ACM SIGMOD Int. Conf. on Management of Data, pp. 379-390, 2000.

(56) References Cited

OTHER PUBLICATIONS

Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda et al.; Using Microsoft Word 97, copyright 1997, QUE Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia, Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken et al.;Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http:/www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
"Creating Charts: An Introduction," Excel for Chemists: . A Comprehensive Guide, E. Joseph Billo. http://www.ahut.edu.cn/yxsz/ahk/Teaching/Excel%for%20Chemists/ChQ2.pdf.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf.
"TeeChart for .NET Charting Control," Steema Software; accessed at: http://www.teechart.net/; accessed on Jan. 11, 2006.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R., "Visualization-enabled multi-document summarization by Iterative Residual Rescaling," Natural Language Engineering, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," Herschel CSDT Meeeting, pp. 1-21 (Sep. 2007).
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce et al.; "Microsoft Outlook Inside Out," 2001, pp. 133, 134, 721-728.
Halvorson et al.; "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M., "Microsoft Office 2003", Feb. 24, 2004, p. 39-40, 120-124, 175-177, 233-234 [D1].
Berliner E.M., "Microsoft Office 2003", Feb. 24, 2004, p. 173-178 [D2].
Perronne et al.; "Building Java Enterprise Systems with J2EE", Publisher: Sams, Pub Date: Jun. 7, 2000 (pp. 1-8).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.xl.com, 2003, 1 page.
"Lookout", http://www.lookoutsoft.com, Apr. 22, 2005, 20 pages.

(56) References Cited

OTHER PUBLICATIONS

"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Screendumps—Microsoft Office (Microsoft Corporation, Microsoft Office Professional Edition 2003; 16 pages).
Clifton, The Application Automation layer—Using XML to Dynamically Generale GUI Elements—forms and controls, The Code Project, Jun. 2003, pp. 1-37.
ScreenShot of MS_Office_2003; (Microsoft Corporation, Microsoft Office Professional Edition 2003; 6 pages).
Halvorson et al.; Microsoft Office Professional Official Manual, Aug. 20, 2002, 10 pgs.
Bellavista, "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
Adler et al.; "Emerging Standards for Component Software," Cybersquare, 1995 IEEE, 10 pgs.
Chamberland et al.; "IBM VisualAge for Java," vol. 37, No. 3, 1998, 26 pgs., http://researchweb.watson.ibm.com/journal/sj/373/chamberland.html [Accessed Feb 6, 2007].
Zykov et al.; "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel, "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in.
Danish Written Opinion Appl. No. SG 200504508-3 dated Sep. 18, 2006.
Danish Search Report Appl. No. SG 200504475-5 dated Sep. 19, 2006.
NZ Application No. 541301, Examination Report dated Jul. 25, 2005.
NZ Application No. 541300, Examination Report dated Jul. 25, 2005.
NZ Application No. 541299, Examination Report dated Jul. 25, 2005.
Australian Search Report dated Jan. 16, 2007 cited in Singapore Application No. 200504474-8.
PCT Written Opinion and Search Report dated Jan. 9, 2007 cited in International Application No. PCT/US2006/033809.
PCT Search Report dated Feb. 6, 2007 cited in International Application No. PCT/US2006/035467.
PCT Search Report dated Feb. 26, 2007 cited in International Application No. PCT/US2006/034993.
European Communicated dated Oct. 20, 2005 cited in EP Application No. 04102463.0/2211 PCT/.
Australian Written Opinion/Search Report cited in Singapore Application No. 200505257-6 mailed Feb. 12, 2007.
International Search Report dated Oct. 17, 2007 cited in International Application No. PCT/US2006/012724.
International Search Report dated Nov. 27, 2007 in PCT/US2007/012573, 9 pages.
Chinese First Office Action dated Mar. 21, 2008 cited in Appln No. 200510092146.4.
Chinese First Office Action dated Mar. 21, 2008 cited in Appln No. 200510092139.4.
Chinese First Office Action dated Apr. 11, 2008 cited in Appln No. 200510092141.1.
Chinese First Office Action dated Apr. 18, 2008 cited in Appln No. 200510092142.6.
Philippines Examiner's Action dated Apr. 21, 2008 cited in Appln No. 1-2005-000405.
Philippines Examiner's Action dated Apr. 21, 2008 cited in Appln No. 1-2005-000406.
Chilean Office Action dated Mar. 28, 2008 cited in Appln No. 1770-05, no English Translation.
Chinese First Office Action dated May 23, 2008 cited in Appln No. 200510089514.X.
European Summons to Attend Oral Proceedings dated Jun. 23, 2008 cited in Appln No. 04102463.9.
Philippines Examiner's Action dated Jul. 31, 2008 cited in Appln No. 12005000495.
Philippines Examiner's Action dated Aug. 19, 2008 cited in Appln No. 12005000405.
Philippines Examiner's Action dated Sep. 12, 2008 cited in Appln No. 1200500406.
Chinese Second Office Action dated Oct. 10, 2008 cited in Appln No. 200510092141.1.
Chinese Second Office Action dated Oct. 17, 2008 cited in Appln No. 200510092139.4.
Chinese Second Office Action dated Nov. 21, 2008 cited in Appln No. 200510089514.X.
European Search Report dated Nov. 25, 2008 cited in Application EP 06 79 0087.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chilean Second Office Action dated Mar. 4, 2009 cited in Appln No. 2512-2005.
European Office Action mailed Mar. 9, 2009, cited in Appln No. 06790087.8.
Chinese Office Action dated Apr. 3, 2009 cited in Appln No. 200510089514.X.
Supplementary European Search Report dated Jun. 9, 2009 cited in EP Application No. 07795391.7-1225.
Mexican Office Action dated Jun. 19, 2009 cited in Appln. No. PA/a/2005/007073.
Chinese Third Office Action dated Jun. 19, 2009 cited in Appln No. 200510092139.4.
Russian Office Action dated Jun. 24, 2009 cited in Appln No. 2005120363/28(023023).
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
Israeli Office Action dated Sep. 6, 2009 cited in Appln No. 169716.
Israeli Office Action dated Sep. 7, 2009 cited in Appln No. 169718.
European Search Report dated Sep. 7, 2009 cited in EP Application No. 09006972.5-2211.
Russian Office Action dated Sep. 10, 2009 cited in Appln No. 2005125836/09(029010).
Russian Office Action dated Sep. 10, 2009 cited in Appln No. 2005125839/09(029013).

(56) References Cited

OTHER PUBLICATIONS

European Communication dated Sep. 14, 2009 cited in Appln. No. 07795391.7-1225.
European Communication dated Sep. 28, 2009 cited in Appln No. 09006972.5-2211.
Israeli Office Action dated Oct. 12, 2009 cited in Appln No. 170668.
Chinese Office Action dated Oct. 16, 2009 cited in Appln No. 200510092142.6.
Russian Office Action dated Oct. 26, 2009 cited in Appln No. 2005120363/09(023023).
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
PCT Search Report and Written Opinion dated Dec. 29, 2009 cited in International Application No. PCT/US2009/046344.
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
Mexican Office Action dated May 4, 2010 cited in Appln No. 2005/008354.
Australian Office Action dated May 28, 2010 cited in Appln No. 2005202717.
Israeli Office Action dated Jul. 5, 2010 cited in Appln No. 169718.
Chinese Second Office Action dated Jul. 6, 2010 cited in Appln No. 200680033212.3.
Mexican Office Action dated Aug. 12, 2010 cited in Appln No. 2005/008354.
PCT Written Opinion and Search Report dated Sep. 2, 2010 cited in International Application No. PCT/U52010/021888.
Malaysian Substantive Examination Adverse Report dated Sep. 30, 2010 cited in Appln No. PI 20052959.
Australian Office Action dated Oct. 21, 2010 cited in Appln No. 2006284908.
Israeli Office Action dated Oct. 28, 2010 cited in Appln No. 169716.
Chinese Second Office Action dated Oct. 29, 2010 cited in Appln No. 200680030421.2.
Notice on Reexamination dated Jan. 21, 2011 cited in Appln No. 200510089514.X.
Chinese Third Office Action dated Feb. 10, 2011 cited in Appln No. 200680033212.3.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Philippines Examiner's Action dated Apr. 12, 2011 cited in Appln No. 1-2005-00404.
Japanese Notice of Rejection dated May 6, 2011 cited in Appln. No. 2005-236087.
Japanese Notice of Rejection dated May 6, 2011 cited in Appln. No. 2005-236089.
U.S. Official Action dated Dec. 23, 2003 in U.S. Appl. No. 09/896,384.
U.S. Official Action dated Apr. 27, 2006 in U.S. Appl. No. 10/800,056.
U.S. Final Official Action dated Oct. 19, 2006 in U.S. Appl. No. 10/800,056.
U.S. Official Action dated Apr. 12, 2007 in U.S. Appl. No. 10/851,506.
U.S. Official Action dated Jun. 4, 2007 in U.S. Appl. No. 10/955,940.
U.S. Official Action dated Jul. 26, 2006 in U.S. Appl. No. 10/741,407.
U.S. Final Official Action dated Jan. 23, 2007 in U.S. Appl. No. 10/741,407.
U.S. Official Action dated Jan. 4, 2007 in U.S. Appl. No. 10/607,020.
U.S. Official Action dated Jun. 14, 2007 in U.S. Appl. No. 10/836,154.
U.S. Official Action dated Jun. 21, 2007 in U.S. Appl. No. 10/955,928.
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 11, 2007 in U.S. Appl. No. 10/955,942.
U.S. Official Action dated Jul. 13, 2007 in U.S. Appl. No. 10/800,056.
U.S. Official Action dated Sep. 6, 2007 in U.S. Appl. No. 11/136,800.
U.S. Official Action dated Sep. 26, 2007 in U.S. Appl. No. 11/151,686.
U.S. Official Action dated Oct. 9, 2007 in U.S. Appl. No. 10/982,073.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.
U.S. Official Action dated Jan. 28, 2008 in U.S. Appl. No. 10/836,154.
U.S. Official Action dated Feb. 20, 2008 in U.S. Appl. No. 10/848,774.
U.S. Official Action dated Feb. 21, 2008 in U.S. Appl. No. 10/851,442.
U.S. Official Action dated Feb. 22, 2008 in U.S. Appl. No. 11/445,393.
U.S. Official Action dated Apr. 15, 2008 in U.S. Appl. No. 10/955,942.
U.S. Official Action dated Apr. 16, 2008 in U.S. Appl. No. 10/955,967.
U.S. Official Action dated Apr. 29, 2008 in U.S. Appl. No. 10/955,941.
U.S. Official Action dated May 28, 2008 in U.S. Appl. No. 10/982,073.
U.S. Official Action dated May 30, 2008 in U.S. Appl. No. 11/430,562.
U.S. Official Action dated Jun. 19, 2008 in U.S. Appl. No. 10/851,506.
U.S. Official Action dated Jun. 20, 2008 in U.S. Appl. No. 10/955,928.
U.S. Official Action dated Jun. 27, 2008 in U.S. Appl. No. 11/430,416.
U.S. Official Action dated Jul. 9, 2008 in U.S. Appl. No. 11/136,800.
U.S. Official Action dated Jul. 17, 2008 in U.S. Appl. No. 10/955,940.
U.S. Official Action dated Jul. 24, 2008 in U.S. Appl. No. 11/151,686.
U.S. Official Action dated Oct. 8, 2008 in U.S. Appl. No. 11/445,393.
U.S. Official Action dated Oct. 28, 2008 in U.S. Appl. No. 11/151,686.
U.S. Official Acton dated Nov. 13, 2008 in U.S. Appl. No. 11/430,562.
U.S. Official Action dated Nov. 25, 2008 in U.S. Appl. No. 11/154,278.
U.S. Official Action dated Dec. 11, 2008 in U.S. Appl. No. 10/982,073.

(56) References Cited

OTHER PUBLICATIONS

U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Jan. 9, 2009 in U.S. Appl. No. 11/430,561.
U.S. Official Action dated Mar. 18, 2009 in U.S. Appl. No. 11/401,470.
U.S. Official Action dated Apr. 7, 2009 in U.S. Appl. No. 10/955,940.
U.S. Official Action dated Apr. 28, 2009 in U.S. Appl. No. 12/028,797.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Acton dated Jun. 19, 2009 in U.S. Appl. No. 11/430,562.
U.S. Official Action dated Jun. 24, 2009 in U.S. Appl. No. 10/607,020.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Sep. 15, 2009 in U.S. Appl. No. 11/217,071.
U.S. Official Action dated Sep. 23, 2009 in U.S. Appl. No. 11/401,470.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action dated Sep. 21, 2010 in U.S. Appl. No. 11/217,071.
U.S. Official Action dated Sep. 27, 2010 in U.S. Appl. No. 10/836,154.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
U.S. Official Action dated Feb. 11, 2011 in U.S. Appl. No. 11/401,470.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
The Discussion Board Component of Blackboard: An Instructor's Guide; Aug. 2004; 23 pgs.
Hock, "Yahoo! To the Max"; May 10, 2005; 5 excerpted pgs.
Homeworking Forum; archived Dec. 6, 2004; 11 pgs.
Venolia et al., Gina Danielle, Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs.
Ohmori, Yasuo et al., "Eigyo Mind—A Sales Support Tool," PFU Tech. Rev., vol. 10, No. 1, pp. 32-38, PFU Limited, May 1, 1999.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Chinese Second Office Action dated Apr. 7, 2011 cited in Application No. 200680032789.2, w/translation.
Japanese Office Action dated Jun. 10, 2011 cited in JP Application No. 2008-530229, w/translation.
Chinese Second Office Action dated Jul. 14, 2011 cited in Appln No. 20680018095.3.
Chinese Decision on Rejection dated Jul. 21, 2011 cited in Appln No. 20068032789.2.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
U.S. Official Action dated Oct. 5, 2009 in U.S. Appl. No. 11/332,822.

(56) References Cited

OTHER PUBLICATIONS

U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Aug. 3, 2011 in U.S. Appl. No. 12/142,927.
Mexican Office Action dated Jan. 6, 2011 cited in Application No. PA/a/2005/008354, 26 pgs.
Mexican Office Action dated Mar. 31, 2011 cited in Application No. PA/a/2005/008351, 46 pgs.
Mexican Office Action dated Mar. 31, 2011 cited in Application No. PA/a/2005/008349, 40 pgs.
Mexican Office Action dated Mar. 31, 2011 cited in Application No. PA/a/2005/008350, 40 pgs.
Russian Office Action dated Jun. 14, 2011 cited in Application No. 2008147090, 2 pgs.
Chinese Third Office Action dated Jun. 21, 2011 cited in Application No. 200680030421.2, 8 pgs.
U.S. Official Action dated Jul. 8, 2011 in U.S. Appl. No. 11/401,470, 16 pgs.
U.S. Official Action dated Jul. 8, 2011 in U.S. Appl. No. 12/163,784, 23 pgs.
U.S. Official Action dated Oct. 25, 2011 in U.S. Appl. No. 12/144,642, 45 pages.
U.S. Official Action dated Nov. 2, 2011 in U.S. Appl. No. 10/836,154, 26 pages.
U.S. Appl. No. 13/102,633, filed May 6, 2011 entitled "Markup Based Extensibility for User Interfaces".
Seo et al, "Hangul Office 2000 Tutoring Book", Sep. 15, 2000, 16 pgs.
Korean Notice of Rejection dated May 17, 2011 cited in Appln No. 10-2004-48176.
Chinese Second Office Action dated May 19, 2011 cited in Appln No. 200780020312.7.
U.S. Official Action dated May 19, 2011 in U.S. Appl. No. 10/851,506.
Mexican Office Action dated May 26, 2011 cited in Appln. No. MX/a/2009/004151.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Sep. 13, 2011 in U.S. Appl. No. 12/372,386.
U.S. Official Action dated Sep. 14, 2011 in U.S. Appl. No. 12/163,758.
Mexican Office Action dated Oct. 3, 2011 cited in Appln. No. MX/a/2008/014849, 10 pages.
Mexican Office Action dated Jan. 22, 2013 cited in Appln No. MX/a/2008/003342, 8 pages.
Mexican Office Action dated Mar. 22, 2013 in Appln No. PA/a/2005/008350, 28 pages.
EP Search Report dated Apr. 18, 2013 in Appln No. PCT/US2006/012724, 12 pgs.
Philippines Substantive Examination Report dated Apr. 25, 2013 cited in Appln No. 1-2005-000495, 2 pages.

EP Search Report dated May 10, 2013 cited in Appln No. PCT/US2009/044292, 6 pages.
Russian Office Action dated May 13, 2013 cited in Appln No. 2010-151922, 7 pages.
Korean Final Notice of Preliminary Rejection dated May 20, 2013 cited in Appln No. 10-2008-7005939, 3 pages.
Mexican Office Action dated May 23, 2013 in Appln No. MX/a/2008/003342, 8 pages.
Chinese Notice on Third Office Action dated Jun. 5, 2013 cited in Appln No. 200980124644.9, 10 pages.
Mexican Office Action dated Jun. 11, 2013 in Appln No. PA/a/2005/008351, 31 pages.
Mexican Office Action dated Jun. 20, 2013 in Appln No. MX/a/2010-014056, 6 pages.
U.S. Official Action dated Apr. 29, 2013 in U.S. Appl. No. 12/954,952, 18 pgs.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
U.S. Official Action dated Jun. 3, 2013 in U.S. Appl. No. 13/102,622, 29 pgs.
U.S. Appl. No. 13/464,572, filed May 4, 2012 entitled "Accessing an Out-Space User Interface for a Document Editor Program", all pages.
U.S. Appl. No. 13/437,031, filed Apr. 2, 2012 entitled "Automatic Grouping of Electronic Mail", all pages.
U.S. Appl. No. 13/427,939, filed Mar. 23, 2012 entitled "An Improved User Interface for Displaying a Gallery of Formatting Options Applicable to a Selected Object", all pages.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Douglas et al., "Dynamic Popup Menu Titles"; IP.com Journal, IP.com Inc., West Henrietta, NY, Aug. 1, 1992, 2 pgs.
Haden et al.; "Scrollable Popup Menu with Selection Tracking Display of Graphical Objects", IP.com Journal, IP.com Inc., West Henrietta, NY, Aug. 1, 1994, 6 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Changing a Graph Type: Ultimate Illustration of Excel 2002 for Windows XP, General Book, X-media Corp., Aug. 31, 2002, p. 224.
Mexican Office Action Summary dated Sep. 22, 2011 cited in Appln. No. MX/a/2008/003342, 10 pages.
Japanese Notice of Rejection dated Nov. 25, 2011 cited in Appln. No. 2008-531249, 8 pages.
Japanese Notice of Rejection dated Dec. 16, 2011 cited in Appln No. 2008-529218, 3 pages.
Korean Notice of Rejection dated Jan. 30, 2012 cited in Appln No. 10-2004-0048176, 5 pages.
Malaysian Substantive Examination Adverse Report dated Jan. 31, 2012 cited in Appln No. PI 20053258, 3 pages.
Malaysian Substantive Examination Adverse Report dated Jan. 31, 2012 cited in Appln No. PI 20053259, 3 pages.
Chinese Decision on Reexamination dated Feb. 1, 2012 cited in Appln No. 200510089514.X, 23 pages.

(56) References Cited

OTHER PUBLICATIONS

Japanese Notice of Rejection dated Feb. 3, 2012 cited in Appln No. 2008-530218, 6 pages.
Mexican Office Action dated Feb. 3, 2012 cited in Appln No. MX/a/2008/002889 with summary, 12 pages.
Taiwan Office Action dated Feb. 8, 2012 cited in Appln No. 94123640, with Eng Lang Summary, 15 pages.
European Search Report dated Feb. 15, 2012 cited in Appln No. 05107157.9, 8 pages.
European Search Report dated Feb. 23, 2012 cited in Appln No. 05107153.8, 8 pages.
Israeli Office Action dated Feb. 23, 2012 cited in Appln No. 170668, 20 pages.
European Search Report dated Feb. 28, 2012 cited in Appln No. 05107184.3, 8 pages.
Chinese Office Action dated Feb. 29, 2012 cited in Appln No. 200980124664.9, 9 pages.
Chinese Decision on Rejection dated Mar. 7, 2012 cited in Appln No. 200780020312.7, 5 pages.
Chinese Second Office Action dated Mar. 9, 2012 cited in Appln No. 200980124383.0, 10 pages.
Japanese Notice of Final Rejection dated Mar. 9, 2012 cited in Appln No. 2008-513476, 2 pages.
Taiwan Search Report dated Mar. 14, 2012 cited in Appln No. 094123420, 7 pages.
European Search Report dated Mar. 16, 2012 cited in Appln No. 05107186.6, 8 pages.
Taiwan Notice of Allowance dated Mar. 29, 2012 cited in Appln No. 10120306600, 6 pages.
Chilean Office Action dated Mar. 29, 2012 cited in Appln No. 1560-2010, w/English Language Summary, 7 pages.
Chilean Office Action dated Mar. 29, 2012 cited in Appln No. 1559-2010, w/English Language Summary, 7 pages.
India First Examination Report dated Mar. 30, 2012 cited in Appln No. 1817/DEL/2005, 2 pages.
Japanese Notice of Allowance dated Apr. 11, 2012 cited in Appln No. 2008-530229, 6 pages.
Chinese Fourth Office Action dated Apr. 27, 2012 cited in Appln No. 200680018095.3, 8 pages.
Japanese Notice of Rejection dated May 11, 2012 cited in Appln No. 2009-513223, 6 pages.
U.S. Official Action dated Jan. 12, 2012 in U.S. Appl. No. 11/782,059, 45 pages.
U.S. Official Action dated Feb. 27, 2012 in U.S. Appl. No. 12/372,386, 41 pages.
U.S. Official Action dated Mar. 14, 2012 in U.S. Appl. No. 12/142,927, 49 pages.
U.S. Official Action dated Apr. 5, 2012 in U.S. Appl. No. 12/163,758, 28 pages.
U.S. Official Action dated Apr. 19, 2012 in U.S. Appl. No. 13/102,633, 90 pages.
U.S. Official Action dated Apr. 26, 2012 in U.S. Appl. No. 11/782,059, 35 pages.
U.S. Official Action dated May 8, 2012 in U.S. Appl. No. 12/144,642, 27 pages.
EP Communication dated Jul. 17, 2013 in Appln No. EP 07 795 391.7, 9 pages.
Chinese Second Office Action dated Aug. 5, 2013 in Appln No. 201080021957.4, 12 pages.
Russian Decision on Grant dated Aug. 12, 2013 in Appln No. 2010151922/08, 18 pages.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
U.S. Official Action dated Aug. 2, 2013 in U.S. Appl. No. 12/777,287, 47 pgs.

U.S. Appl. No. 13/464,572, filed May 4, 2012 entitled "Accessing an Out-Space User Interface for a Document Editor Program".
U.S. Appl. No. 13/595,084, filed Aug. 27, 2012 entitled "Command User Interface for Displaying Selectable Software Functionality Controls".
Redmond, Tony; Excerpt from Book; Microsoft Exchange Server 2003; Published 2003; 14 pgs.
Chinese Office Action dated Jul. 2, 2012 in Appln No. 200980124944.7, 8 pages.
Korean Notice of Preliminary Rejection dated Jul. 2, 2012 cited in Appln No. 10-2012-0024393, 5 pages.
Chinese Office Action dated Jul. 12, 2012 in Appln No. 201080008789.5, 8 pages.
Korean Notice of Preliminary Rejection dated Jul. 19, 2012 cited in Appln No. 10-2007-7024571, 6 pages.
Chinese Decision on Rejection dated Jul. 31, 2012 cited in Appln No. 200680018095.3, 17 pages.
Chinese Office Action dated Aug. 2, 2012 in Appln No. 200980124945.1, 8 pages.
Chinese Third Office Action dated Aug. 14, 2012 in Appln No. 200980124383.0, 8 pages.
U.S. Official Action dated Jun. 19, 2012 in U.S. Appl. No. 12/769,787, 94 pages.
U.S. Appl. No. 14/032,094, filed Sep. 19, 2013 entitled "User Interface for Displaying Selectable Software Functionality Controls that are Relevant to a Selected Object", Satterfield et al.
Mexican Office Action dated Jun. 11, 2013 cited in Appln. No. MX/a/2008/003342, 9 pages.
Israeli Office Action dated Jun. 18, 2013 cited in Appln No. 170668, 4 pages.
Japanese Notice of Rejection dated Sep. 19, 2013 in Appln No. 2012-153634, 6 pages.
Mexican Office Action dated Sep. 27, 2013 in Appln No. MX/a/2008/014849, 9 pages.
EP Communications to Attend Oral Proceedings dated Oct. 4, 2013 in Appln No. 09 006 972.5, 13 pages.
Canadian OA dated Oct. 7, 2013 in Appln No. 2,650,016, 2 pages.
Chilean Third Office Action dated Oct. 9, 2013 in Appln No. 2512-2005, 7 pages.
Mexican Office Action dated Oct. 28, 2013 cited in Appln. No. MX/a/2010/013566, 8 pages.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Appl. No. 13/769,598, filed Feb. 18, 2013 entitled "Automatic Conversation Techniques".
Israeli Office Action dated Jun. 3, 2012 cited in Appln No. 189293, 4 pages.
Canadian Office Action dated Nov. 29, 2012 cited in Appln No. 2,512,036, 2 pgs.
EP Communication dated Jan. 10, 2013 cited in Appln No. PCT/US2010/021888, 8 pgs.
Malaysia Substantive Examination Adverse Report dated Jan. 15, 2013 in Appln No. PI 20084401, 3 pgs.
EP Search Report dated Jan. 30, 2013 in Appln No. PCT/US2009/044059, 8 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
U.S. Appl. No. 13/925,523, filed Jun. 24, 2013 entitled "Communication Between a Document Editor-in-Space User Interface and a Document Editor Out-Space User Interface", Dukhon et al.
Mexican Office Action dated Jul. 9, 2013 in Appln No. MX/a/2008/002889, 13 pages.
Canadian Office Action dated Sep. 18, 2013 in Appln No. 2,512,036, 3 pages.

(56) References Cited

OTHER PUBLICATIONS

India First Examination Report dated Oct. 21, 2013 cited in Appln No. 1017/DEL/2004, 2 pages.
Canadian Office Action dated Oct. 30, 2013 in Appln No. 2,512,047, 3 pages.
Canadian Office Action dated Nov. 15, 2013 in Appln No. 2,512,102, 3 pages.
U.S. Official Action dated Nov. 8, 2013 in U.S. Appl. No. 13/615,668, 114 pgs.
Dr. Dobb's Journal; "Windows 95 Common Controls"; May 1, 1995; 12 pgs.
Korean Notice of Rejection dated Nov. 3, 2011 cited in Appln No. 10-2005-0067257.
Japanese Notice of Rejection dated Nov. 4, 2011 cited in Appln No. 2008-513476.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
European Search Report dated Dec. 6, 2011 cited in Appln No. 06803424.8.
Israeli Office Action dated Oct. 17, 2013 cited in Appln No. 1611334, 4 pages.
Korean Notice of Preliminary Rejection dated Nov. 7, 2013 cited in KR-10-2008-7029272, 7 pages.
Chinese Third Office Action dated Dec. 4, 2013 in Appln No. 200680032789.2, 6 pages.
U.S. Official Action dated Nov. 15, 2013 in U.S. Appl. No. 11/782,059, 33 pgs.
U.S. Official Action dated Nov. 29, 2013 in U.S. Appl. No. 12/144,642, 73 pgs.
U.S. Official Action dated Dec. 6, 2013 in U.S. Appl. No. 10/851,506, 25 pgs.
Israeli Office Action dated Aug. 29, 2012 in Appln No. 169717, 4 pages.
Korean Notice of Preliminary Rejection dated Nov. 12, 2012 cited in KR-10-2008-7005939, 7 pages.
Canadian Office Action dated Nov. 23, 2012 cited in Appln No. 2,512,102, 5 pages.
Canadian Office Action dated Nov. 29, 2012 cited in Appln No. 2,512,047, 4 pages.
Chinese Second Office Action dated Dec. 17, 2012 cited in Appln No. 200980124644.9, 10 pages.
U.S. Official Action dated Oct. 24, 2012 in U.S. Appl. No. 13/102,633, 41 pages.
U.S. Official Action dated Nov. 23, 2012 in U.S. Appl. No. 11/782,059, 49 pages.
U.S. Official Action dated Dec. 5, 2012 in U.S. Appl. No. 12/777,287, 36 pages.
U.S. Appl. No. 13/615,668, filed Sep. 14, 2012 entitled "User Interface for Displaying Selectable Software Functionality Controls that are Relevant to a Selected Object".
Russel et al., (hereinafter "Russel"); "Special Edition Using Microsoft® Office Outlook® 2003"; Que publishing on Sep. 25, 2003, 71 pgs.
Malaysian Examination Report dated Aug. 30, 2012 in Appln No. PI 20080400, 3 pages.
Chinese Second Office Action dated Sep. 12, 2012 in Appln No. 200980124944.7, 13 pages.
Mexican Office Action Summary dated Sep. 18, 2012 in Appln No. MX/a/2008/003342, 8 pages.
Chilean Office Action dated Sep. 21, 2012 cited in Appln No. 1560-2010, w/English Language Summary, 8 pages.
EP Communication dated Sep. 26, 2012 cited in Appln No. PCT/US2006/034993, 10 pages.

U.S. Official Action dated Aug. 7, 2012 in U.S. Appl. No. 10/836,154, 41 pages.
U.S. Official Action dated Sep. 11, 2012 in U.S. Appl. No. 12/163,784, 49 pages.
U.S. Official Action dated Sep. 13, 2012 in U.S. Appl. No. 13/437,031, 79 pages.
Russel et al., (hereinafter "Russel"); "Special Edition Using Microsoft® Office Outlook® 2003"; Que publishing on Sep. 25, 2003, 71 pgs., 71 pages.
Israeli Office Action dated May 3, 2012 cited in Appln No. 169718, 4 pages.
Taiwan Office Action dated May 14, 2012 cited in Appln No. 94122180, with Eng Lang Summary, 5 pages.
Mexican Office Action dated Jun. 6, 2012 cited in Appln No. MX/a/2008/014849, 8 pages.
Chinese Second Office Action dated Jun. 18, 2012 in Appln No. 200910148820.4, 6 pages.
Mexican Office Action dated Jun. 25, 2012 in Appln No. PA/a/2005/008354, 25 pages.
U.S. Official Action dated Jun. 6, 2012 in U.S. Appl. No. 12/777,287, 98 pages.
Microsoft Office 2007 Word Help, 3 pgs.
Alexander, Keeping New Messages Marked 'Unread' (2007), http://certcities.com/editorial/colums/story.asp? EditorialsD=243, 2 pgs.
Wiley, Microsoft® Office Outlook® 2007 for Dummies®, 9 pgs.
Chilean Second Office Action dated Nov. 21, 2012 cited in Appln No. 1559-2010, 6 pages.
Russian Office Action dated Dec. 12, 2012 cited in Appln No. 2010140069, 8 pages.
Chinese Third Office Action dated Dec. 31, 2012 in Appln No. 200980124944.7, 14 pages.
Chinese Second Office Action dated Dec. 31, 2012 in Appln No. 200980124945.1, 8 pages.
Chinese Second Office Action dated Jan. 4, 2013 in Appln No. 201080008789.5, 8 pages.
Chinese Office Action dated Jan. 6, 2013 in Appln No. 201080021957.4, 9 pages.
Canadian Office Action dated Jan. 18, 2013 in Appln No. 2,512,155, 6 pages.
U.S. Official Action dated Dec. 12, 2012 in U.S. Appl. No. 10/851,506, 76 pages.
U.S. Official Action dated Dec. 12, 2012 in U.S. Appl. No. 12/954,952, 86 pages.
U.S. Official Action dated Dec. 31, 2012 in U.S. Appl. No. 12/142,927, 49 pages.
Miser, "Special Edition Using Mac OS x v10.2"; Pub. Date Jan. 3, 2003; QUE; Spe. Ed.; pp. 272-275.
Mori et al., "Design and Development of Multidevice User Interfaces through Multiple Logical Descriptions"; Aug. 2004; vol. 30; 14 pgs.
Malaysian Substantive Examination Report dated Oct. 31, 2012 cited in Appln No. PI 20053260, 2 pgs.
Canadian Office Action dated Nov. 29, 2012 cited in Appln No. 2,511,101 3 pgs.
Korean Notice of Rejection dated Feb. 22, 2013 in Appln No.10-2008-7005078 13 pgs.
Mexican Office Action dated Feb. 25, 2013 in Appln No. MX/a/2008/002889, 11 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Chinese Fourth Office Action dated Apr. 23, 2013 cited in Appln No. 200980124944.7, 7 pgs.
U.S. Official Action dated Mar. 1, 2013 in U.S. Appl. No. 11/430,562, 66 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.

(56) References Cited

OTHER PUBLICATIONS

U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
Mexican Office Action dated Aug. 20, 2013 in Appln No. MX/a/2011/011749.
U.S. Appl. No. 14/142,132, filed Dec. 27, 2013 entitled "Expanded Search and Find User Interface".
U.S. Appl. No. 14/150,531, filed Jan. 8, 2014 entitled "Modifying and Formatting a Chart Using Pictorially Provided Chart Elements".
Inoue; "Let's Learn PowerPoint Using Actual Samples"; Nikkei PC21, Japan, Nikkei Business Publications, Inc., Apr. 1, 2008, vol. 13, No. 7.
Canadian Office Action dated Dec. 5, 2013 in Appln No. 2,618,169.
Japanese Office Action dated Jan. 9, 2014 cited in JP Application No. 2012-510906 w/translation.
Chinese Decision on Rejection dated Jan. 13, 2014 in Appln No. 200980124644.9.
EP Communication dated Feb. 11, 2014 cited in Appln No. 09 798 374.6.
Mexican Office Action dated Feb. 11, 2014 cited in Appln No. Mx/a/2008/003342, 8 pgs.
EP Communication on Decision to Refuse dated Feb. 20, 2014 cited in Appln No. 09 006 972.5.
U.S. Official Action dated Jan. 16, 2014 in U.S. Appl. No. 13/102,633, 45 pgs.
U.S. Official Action dated Jan. 29, 2014 in U.S. Appl. No. 12/777,287, 44 pgs.
Malaysian Substantive Examination Report dated Jan. 15, 2014 in Appln No. PI 20080508, 3 pgs.
Canadian Office Action dated Jan. 28, 2014 in Appln No. 2,511,101, 4 pgs.
Australian Office Action dated Feb. 28, 2014 in Appln No. 2009262834, 3 pgs.
Australian Office Action dated Feb. 28, 2014 in Appln No. 2009262833, 3 pgs.
Australian Office Action dated Mar. 4, 2014 in Appln No. 2009260596, 4 pgs.
Australian Office Action dated Mar. 4, 2014 in Appln No. 2009271517, 3 pgs.
U.S. Official Action dated Feb. 4, 2014 in U.S. Appl. No. 10/607,020, 149 pgs.
U.S. Official Action dated Feb. 26, 2014 in U.S. Appl. No. 12/954,952, 38 pgs.
U.S. Official Action dated Mar. 3, 2014 in U.S. Appl. No. 11/332,822, 38 pgs.
U.S. Official Action dated Mar. 4, 2014 in U.S. Appl. No. 12/142,927, 45 pgs.
U.S. Appl. No. 14/226,421, filed Mar. 24, 2014 entitled "Exposing Non-Authoring Features Through Document Status Information in an Out-Space User Interface".
Mexican Office Action dated Aug. 20, 2013 in Appln No. Mx/a/2011/011749, 10 pgs.
EP Communication dated Jan. 27, 2014 in Appln No. 09 767 2208, 7 pgs.
Norway Office Action dated Feb. 10, 2014 in Appln No. 20053655, 4 pgs.
Norway Office Action dated Feb. 10, 2014 in Appln No. 20053658, 4 pgs.
Taiwan Office Action dated Mar. 17, 2014 in Appln. No. 98118252, 10 pgs.
India First Examination Report dated Mar. 19, 2014 in Appln No. 1818/DEL/2005, 1 pg.
Chilean Office Action dated Mar. 30, 2014 in Appln No. 2804-2011, 7 pgs.
Chinese Third Office Action dated Apr. 3, 2014 in Appln No. 201080021957.4, 6 pgs.
Canadian Office Action dated Apr. 25, 2014 in Appln No. 2,512,155, 9 pgs.
U.S. Official Action dated Apr. 18, 2014 in U.S. Appl. No. 11/782,059, 42 pgs.
U.S. Official Action dated Apr. 24, 2014 in U.S. Appl. No. 12/028,797, 42 pgs.
Ramamritham et al., Scheduling Algorithms and Operating Systems Support for Real-Time Systems; © 1994; IEEE; 13 pages.
Zweben et al., Scheduling and Rescheduling with Iterative Repair, ©1993; IEEE; 9 pages.
U.S. Official Action dated May 14, 2014 in U.S. Appl. No. 13/615,668, 34 pgs.
U.S. Official Action dated May 30, 2014 in U.S. Appl. No. 13/027,289, 188 pgs.
U.S. Official Action dated Jun. 2, 2014 in U.S. Appl. No. 12/144,642, 32 pgs.
Australian Second Office Action dated Apr. 29, 2014 in Appln No. 2009271517, 3 pgs.
Philippines Substantive Examination Report dated Apr. 30, 2014 cited in Appln No. 1-2008-500356, 1 pg.
Australian Office Action dated Apr. 30, 2014 in Appln No. 2010247882, 3 pgs.
EP Search Report dated Jun. 2, 2014 in Appln No. PCT/US20101034277, 6 pgs.
Malaysian Notice of Allowance Received in Patent Application No. PI 20080400, Mailed Date: Sep. 13, 2013, Filed Date: Aug. 29, 2006, 2 Pages.
Notice of Allowance Received for Korea Republic of (KR) Patent Application No. 10-2008-7005939, Mailed Date: Nov. 20, 2013, Filed Date: Sep. 12, 2006, 2 Pages. (MS# 312668.07) (w/o English Translation).
Japanese Office Action Issued in Patent Application No. 2011-550149, Mailed Date: Jan. 20, 2014, Filed Date: Jan. 22, 2010, 5 Pages. (MS# 325993.12).
Australian Office Action Issued in Patent Application No. 2010216342, Mailed Date: Mar. 14, 2014, Filed Date: Jan. 22, 2010, 3 Pages. (MS# 325993.04).
Mexican Notice of Allowance Received in Patent Application No. Mx/a/2008/002889, Mailed Date: Apr. 1, 2014, Filed Date: Aug. 29, 2006, 1 Page. (w/o English Translation).
Russian Notice of Allowance Issued in Patent Application No. 2011134380, Mailed Date: Apr. 5, 2014, Filed Date: Jan. 22, 2010, 22 Pages. (MS# 325993.16).
Australian Notice of Allowance Received for Australia Patent Application No. 2009262833, Mailed Date: Apr. 16, 2014, Filed Date: Jun. 5, 2009, 2 Pages. (MS# 323861.04).
Taiwan Search Report dated May 7, 2014 cited in Appln No. 098117357, 13 pgs.
Japanese Notice of Allowance Issued in Patent Application No. 2011-550149, Mailed Date: May 8, 2014, Filed Date: Jan. 22, 2010, 4 Pages. (MS# 325993.12).
Australian Second Office Action Issued in Patent Application No. 2010216342, Mailed Date: May 12, 2014, Filed Date: Jan. 22, 2010, 3 Pages. (MS# 325993.04).
Taiwan Search Report dated May 12, 2014 cited in Appln No. 098119245, 11 pgs. (MS# 323861.03).
Notice Of Allowance Issued in Chinese Patent Application No. 200680032789.2, Mailed Date: May 15, 2014, Filed Date: Sep. 8, 2006, 3 Pages.
Russian Decision on Grant dated May 20, 2014 in Appln No. 2011145984/08, 24 pgs.
EP Communication dated Jun. 2, 2014 in Appln No. 07 795 391.7, 9 pgs.
Chilean Second Office Action dated Jun. 6, 2014 in Appln No. 1987-2011, 12 pgs.
Russian Decision on Grant dated Jul. 20, 2014 in Appln No. 2010138162, 14 pgs.—No English Language Translation.
U.S. Official Action dated Jul. 1, 2014 in U.S. Appl. No. 12/372,386, 93 pgs.
U.S. Official Action dated Jul. 30, 2014 in U.S. Appl. No. 13/102,633, 36 pgs.
Ringel et al., "Automated Message Prioritization: Making Voicemail Retrieval More Efficient"; In CHI'02 Extended Abstracts on Human Factors in Computing Systems; Apr. 20, 2002; pp. 592-593.

(56) References Cited

OTHER PUBLICATIONS

Kumar et al., "A personal agent application for the semantic web"; In AAAI Fall Symposium on Personalized Agents; 2002; pp. 1-8.
Gorniak, Peter; "Sorting email messages by topic"; 1998; 1 pg.
Maes et al., "Learning Interface Agents"; in AAAI (vol. 93); 1993; pp. 459-465.
Russian Notice of Allowance Issued in Patent Application Number. 2010152843, Mailed Date: Feb. 20, 2014, 16 Pages. (MS# 323309. 15).
Israeli Office Action dated Feb. 28, 2014 in Appln No. 209012, 6 pgs.
Mexican Office Action Received for Mexican Patent Application No. PA/a/2005/008349, Mailed Date: Mar. 14, 2014, Filed Date: Aug. 5, 2005, 12 Pages. (MS# 309411.11) (w/o English Translation).
Canadian Office Action dated Jul. 30, 2014 cited in Appln No. 2,512,155, 8 pgs.
Canadian Office Action dated Jul. 30, 2014 cited in Appln No. 2,512,102, 7 pgs.
Chinese Third Office Action dated Aug. 12, 2014 cited in Appln No. 200780020312.7, 13 pgs.
Mexican Office Action dated Aug. 14, 2014 cited in Appln No. PA/a/2005/008349, 18 pgs.
U.S. Official Action dated Aug. 25, 2014 in U.S. Appl. No. 13/464,572, 117 pgs.
U.S. Official Action dated Sep. 11, 2014 in U.S. Appl. No. 13/427,939, 133 pgs.
Microsoft Office XP/2002, Wikipedia, http://en.wikipedia.org/wiki/Microsoft_Office_XP, May 31, 2001; 3 pgs.
Akamatsu, "Touch with a Mouse, A Mouse Type Interface Device with Tactile and Force Display"; © IEEE; 1995; 5 pgs.
Mexican Office Action Received in Patent Application No. MX/a/2010/013566, Mailed Dated: Jun. 12, 2013, 3 Pages. (MS# 323482. 13).
Israeli Office Action Received in Patent Application No. 209011, Mailed Dated: Sep. 10, 2013, 5 Pages.(MS# 323482.09).
Israeli Office Action dated Mar. 6, 2014 in Appln No. 194785, 5 pgs.
Chilean Office Action Received in Patent Application No. 2804-2011, Mailed Date: Apr. 4, 2014, 7 Pages (w/o English Translation) (MS# 326876.06).
Canadian Office Action dated Sep. 4, 2014 in Appln No. 2,512,036, 3 pgs.
Chinese Office Action dated Sep. 15, 2014 in Appln No. 201210079579.6, 11 pgs.
Canadian Office Action dated Sep. 30, 2014 in Appln No. 2,617,182, 3 pgs.
Chinese Decision on Reexamination dated Nov. 18, 2014 in Appln. No. 200910148820.4, 15 pgs.
U.S. Official Action dated Sep. 10, 2014 in U.S. Appl. No. 12/954,952, 52 pgs.
U.S. Official Action dated Sep. 18, 2014 in U.S. Appl. No. 11/782,059, 41 pgs.
U.S. Official Action dated Sep. 30, 2014 in U.S. Appl. No. 13/595,084, 185 pgs.
U.S. Official Action dated Oct. 10, 2014 in U.S. Appl. No. 11/332,822, 47 pgs.
U.S. Official Action dated Oct. 24, 2014 in U.S. Appl. No. 13/615,668, 35 pgs.
U.S. Official Action dated Nov. 28, 2014 in U.S. Appl. No. 13/437,031, 100 pgs.
Embedding and Linking Excel Worksheets into Word; 2001, The McGraw-Hill Companies, Inc, 6 pgs.
U.S. Official Action dated Dec. 24, 2014 in U.S. Appl. No. 13/102,633, 42 pgs.
Chilean Office Action dated Oct. 24, 2014 in Appln No. 2804-2011, 5 pgs. (w/o English Translation).
Israel Office Action Issued in Patent Application No. 169717, Mailed Date: Oct. 29, 2014, 1 Page; (w/o English Translation).
Malaysian Substantive Examination Report dated Nov. 14, 2014 in Appln No. PI 2010005637, 3 pgs.
India First Examination Report dated Dec. 23, 2014 in Appln No. 1819/del/2005, 2 pgs.
Norwegian Office Action dated Nov. 29, 2014 in Appln No. 20053658 4 pgs.
Norwegian Office Action dated Nov. 29, 2014 in Appln No. 20053655, 3 pgs.
U.S. Official Action dated Jan. 15, 2015 in U.S. Appl. No. 12/028,797, 47 pgs.
U.S. Official Action dated Feb. 24, 2015 in U.S. Appl. No. 13/769,598, 33 pgs.
U.S. Official Action dated Feb. 24, 2015 in U.S. Appl. No. 11/782,059, 37 pgs.
Indonesian Office Action Issued in Patent Application No. P00200500444, Mailed Date: Jan. 16, 2015, 3 Pages. (w/o English Translation).
Chinese Third Office Action dated Feb. 2, 2015 in Appln No. 200910148820.4, 12 pgs.
Israeli Office Action Issued in Patent Application No. 213908, Mailed Date: Feb. 3, 2015, 3 pages. (w/o English Translation).
Chinese Fourth Office Action dated Feb. 15, 2015 in Appln No. 200780020312.7, 9 pgs.
India Examination Report dated Feb. 17, 2015 in Appln No. 1568/DEL/2005, 3 pgs.
Canadian Office Action dated Feb. 19, 2015 in Appln No. 2,848,667, 5 pgs.
Canadian Office Action dated Feb. 19, 2015 in Appln No. 2,848,700, 4 pgs.
"Microsoft Office 2003 Editions Product Guide", Published on: Sep. 2003, Available at: tp:/Iwww.google.ca/url? sa=t&rct=j&q=&esrc=s &frm=1&source=web&cd=3&ved=OCCoQ FjAC &url=http%3A%2 P/02Fdown load.microsoft.com% 2Fdownload%2F0/02Ff°/02F1%2F0f1d5b1f-53bc-47c3-bf6f-ac6d67cf9766%2FOffice2003Guide. doc&ei=CKTkVPBCgb-xBL6qgvAH&usg=AFQjCNEpNk4IFH6m27BXr481Kv1kRXo_xA, 167 pgs.
Malaysian Substantive Examination Report dated Jan. 30, 2015 in Appln No. PI 2010005439 3 pgs.
Malaysian Modified Substantive Examination Report dated Jan. 30, 2015 in Appln No. PI 2010005558, 3 pgs.

\* cited by examiner

HIERARCHICALLY-ORGANIZED CONTROL GALLERIES

BACKGROUND

Millions of people use office applications in their daily lives. Such office applications include word processor applications, spreadsheet applications, database applications, slideshow presentation applications, note-taking applications, web page design applications, and so on. Since their initial creation, office applications have grown progressively more complex and new commands have continued to be added. As a result, an office application may easily have hundreds of commands.

Because an office application can have so many commands, it is important to organize the controls associated with the commands in a way that enables a user to find controls quickly. Traditional menu structures are not always effective in organizing commands because the menus can contain too many controls. Traditional toolbar structures are not always effective in organizing commands because the toolbars may occupy too much of the user's visible screen area.

SUMMARY

A computing system causes a display device to display a graphical user interface having hierarchically-organized control galleries. The graphical user interface contains a document area and a control ribbon. The document area contains at least a portion of a document that a user is editing. The control ribbon includes a class control gallery. The class control gallery includes a plurality of class controls associated with different classes of related commands. After the user selects one of the class controls, the computing system causes the display device to display a variation control gallery in the user interface. The variation control gallery contains variation controls in a class associated with the selected one of the class controls. While the variation control gallery is displayed, the user selects one of the variation controls in the variation control gallery. In response to the selection of the variation control, the computing system modifies the document by executing a command associated with the variation control.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, a computing system provides a graphical user interface having hierarchically-organized control galleries. This disclosure describes the techniques with reference to the attached figures. The attached figures are examples. It should be understood that the attached figures do not represent a sole way of implementing the techniques of this disclosure.

Figure 1:
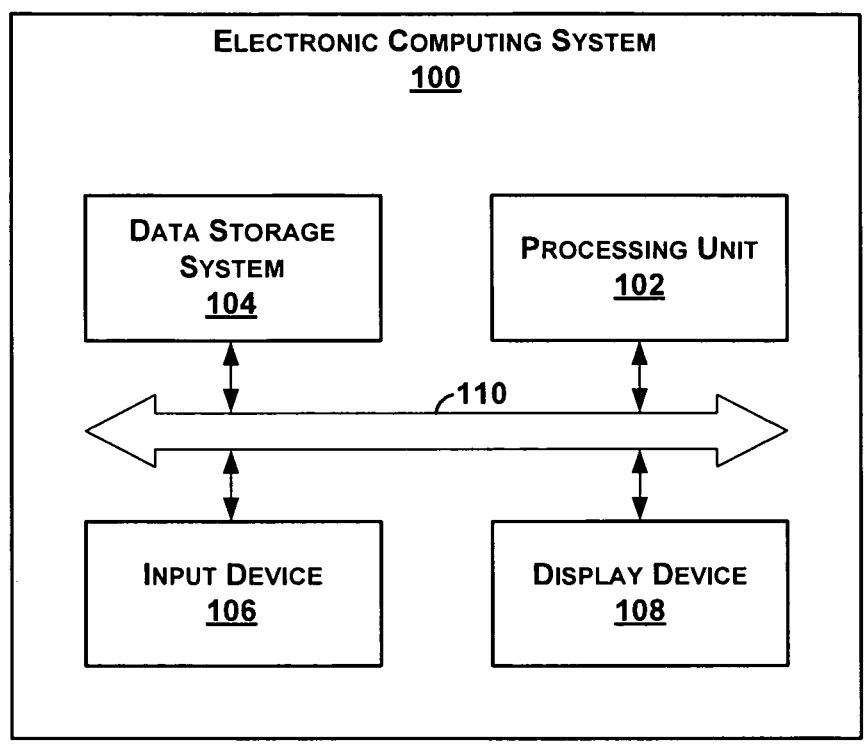
FIG. 1 is a block diagram illustrating an example computing system.

FIG. 1 is a block diagram illustrating an example computing system 100. It is to be understood that the computing system 100 is merely one example. The techniques of this disclosure may be implemented in many other ways. For instance, other computing systems may include more or fewer components, systems, connections, and so on.

The computing system 100 is a set of one or more electronic computing devices. An example electronic computing device is described below with reference to FIG. 6. The computing system 100 may be a wide variety of different types of computing system. For example, the computing system 100 may be a personal computer, a media player, a television set top box, a television, a home appliance, an industrial appliance, a device integrated into a vehicle, a video game console, an Internet kiosk, a netbook, a laptop computer, a handheld video game device, an intermediate network device, a standalone server device, a server blade device, a network storage device, a wearable computing device or another type of electronic computing device.

As illustrated in the example of FIG. 1, the computing system 100 comprises a processing unit 102. The processing unit 102 is a set of one or more integrated circuits that execute software instructions. For example, the processing unit 102 may include one or more microprocessors, such as Intel CORE 2® microprocessors or Advanced Micro Devices ATHLON® microprocessors. In implementations in which the processing unit 102 comprises a plurality of integrated circuits, the processing unit 102 may comprise a communications infrastructure to facilitate data exchanges between the integrated circuits.

In addition, the computing system 100 comprises a data storage system 104. The data storage system 104 comprises a set of one or more computer-readable data storage media. As used in this disclosure, a computer-readable data storage medium is a physical machine or manufacture capable of storing electronic data in a non-transient manner. Example types of computer-readable data storage media include random access memory (RAM) units, magnetic disk drives, flash memory devices, floppy disks, compact discs (CDs), Digital Versatile Discs (DVDs), Blu-Ray discs, magnetic data storage tape, laser discs, electrically-erasable programmable read only memory (EEPROM), read-only memory (ROM), and other types of physical machines or manufactures capable of storing electronic data in a non-transient manner. In instances where the data storage system 104 comprises a plurality of computer-readable data storage media, the computer-readable data storage media may be geographically dispersed. For example, one of the computer-readable data storage media may be located in Atlanta and another one of the computer-readable data storage media may be located in Istanbul. In other instances, each computer-readable data storage medium may be located within one box (e.g., within a personal computer).

The data storage system 104 stores computer-executable instructions. The processing unit 102 retrieves sets of the instructions from the data storage system 104 and executes the retrieved instructions. When the processing unit 102 executes the instructions, the instructions cause the computing system 100 to perform various actions. For instance, when the processing unit 102 executes an instruction to add two numbers and store a resulting sum, the computing system 100 adds the two numbers and stores the resulting sum. This disclosure describes the computing system 100 as performing various actions. It may be assumed, unless otherwise indicated, that the computing system 100 performs such actions when the processing unit 102 executes one or more instructions stored in the data storage system 104.

The computing system 100 also comprises an input device 106 that enables a user to provide input to the computing system 100. The input device 106 may be a wide variety of different types of devices. For example, the input device 106 may be a mouse, a keyboard, a microphone, a joystick, a trackball, a stylus input device, a touch screen display, or another type of device that enables a use to provide input to a computing system.

Furthermore, the computing system 100 comprises a display device 108. The display device 108 is a physical device capable of displaying graphical images. For example, the display device 108 may be a cathode ray tube (CRT) monitor, a television, a liquid crystal display (LCD) screen, a light-emitting diode (LED) screen, a plasma screen, or another type of device capable of displaying graphical images.

The computing system 100 also includes a communications infrastructure 110. The communications infrastructure 110 facilitates communication of electronic data among the processing unit 102, the data storage system 104, the input device 106, and the display device 108. The communications infrastructure 110 may be implemented in a wide variety of ways. For example, the communications infrastructure 110 may be implemented as a plurality of separate devices. In one instance, the communications infrastructure 110 may be implemented as two buses: one bus that facilitates communication between the processing unit 102 and the data storage system 104 and another bus that facilitates communication between the input device 106 and the data storage system 104 and between the display device 108 and the data storage system 104. In other examples, the communications infrastructure 110 may include one or more computer networks, such as the Internet or a local area network, that facilitate communication of electronic data.

The computing system 100 executes an application that enables a user to edit a document. The document may be a wide variety of different types of documents. For example, the document may be a slideshow presentation document. In this example, the application may be the Microsoft POWERPOINT® presentation graphics program. In other examples, the document may be a word processor document, a spreadsheet document, an e-mail document, a digital image document, or another type of electronic document.

The application provides a graphical user interface (GUI) having a control ribbon and a document area. The document area contains at least a portion of a document that the user is editing. The control ribbon includes one or more hierarchically-organized control galleries. As used in this disclosure, a control gallery is a scrollable screen element containing a set of selectable controls. As described in detail below, each control in a first control gallery is associated with a class of related commands. When a user of the computing system 100 has selected a control in the first control gallery, the computing system 100 displays a second control gallery. The second control gallery contains controls associated with each command in the class associated with the selected control in the first control gallery. In a typical implementation, the second control gallery does not contain controls in classes associated with any of the other controls in the first control gallery. In response to a selection of a control in the second control gallery, the computing system 100 modifies the document by executing a command associated with the selected control in the second control gallery.

A wide variety of commands may be associated with controls in the hierarchically-organized control galleries. Example types of commands include commands that apply slide transition effects (STEs), commands that apply in-slide object animation effects, commands that apply text styles, commands that apply graphics styles, and other types of commands that modify documents. As used in this disclosure, a STE is a graphical effect occurring during presentation of a slideshow when the slideshow transitions to a slide. In one example implementation, STEs are implemented by applying one or more primitives to one or more slides. As used in this disclosure, a primitive is a software program that, when executed, modifies one or more display properties of a slide. Display properties of a slide are properties that control how the slide is displayed during a presentation of a slideshow containing the slide. Example display properties of a slide include a vertical position of the slide, a horizontal position of the slide, a transparency level of the slide, a size of the slide, and other properties that control how the slide is displayed. A STE command is a command that modifies a document to associate a STE with a slide. As used in this disclosure, a STE that a STE command associates with a slide is referred to as the target STE of the STE command.

As used in this disclosure, an in-slide object animation effect is a graphical effect applied to an in-slide object during presentation of a slide containing the in-slide object. An in-slide object is an object present within a single slide. Example types of in-slide objects include text boxes, clip art, images, diagrams, media objects, tables, charts, and other types of objects within a single slide. In one example implementation, in-slide object animation effects are implemented by applying one or more primitives to one or more in-slide objects.

Commands can be subdivided into classes in a variety of ways. For example, STE commands can be subdivided into classes based on primitives used to implement the target STEs of the STE commands. In one example implementation, for each class of STE commands, the target STEs of each STE command in the class are implemented using a shared set of primitives. In this instance, no two STE commands in different classes have target STE's implemented using a shared set of primitives. For example, each STE command in a first class of STE commands has a target STE implemented using a primitive that adjusts slide position and a primitive that adjusts slide transparency. In this example, each STE command in a second class of STE commands has a target STE implemented using a primitive that adjusts slide transparency and a primitive that adjusts slide size.

The hierarchically-organized control galleries may enable the user to locate a desired control more quickly. For example, a slideshow presentation application may have sixty distinct STE commands. In this example, it may be time consuming for the user to scroll through a control gallery containing controls for all sixty STE commands. Furthermore, in this example, the sixty STE commands may be subdivided into a set of six classes. Assuming that each class contains ten STE commands, the user would only have to scroll through a first control gallery containing six class controls to identify an appropriate class of STEs and then scroll through a second control gallery containing ten controls. This may enable the user to more quickly identify the desired control.

Figure 2:
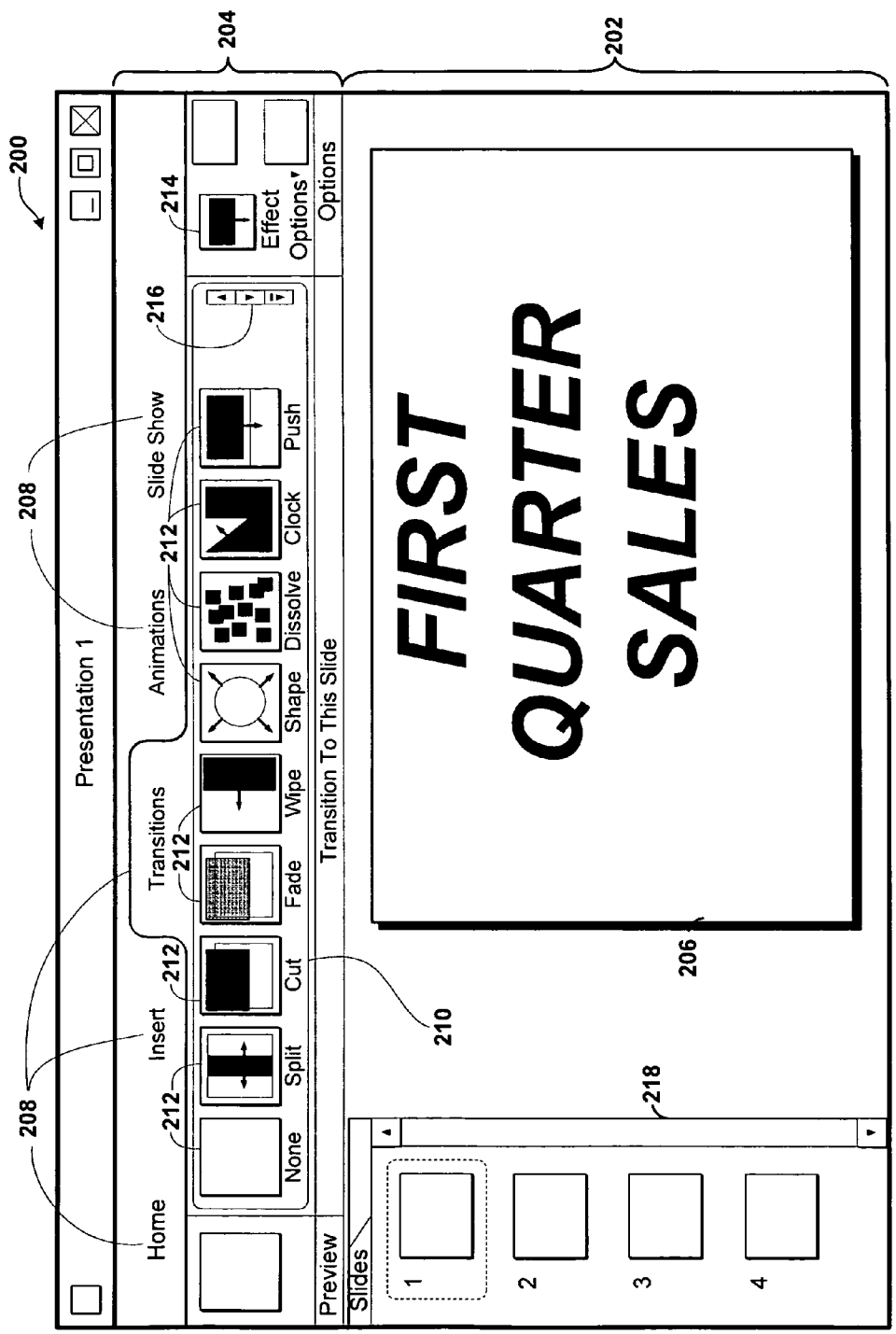
FIG. 2 is an example screen diagram illustrating a first graphical user interface.
Figure 3:
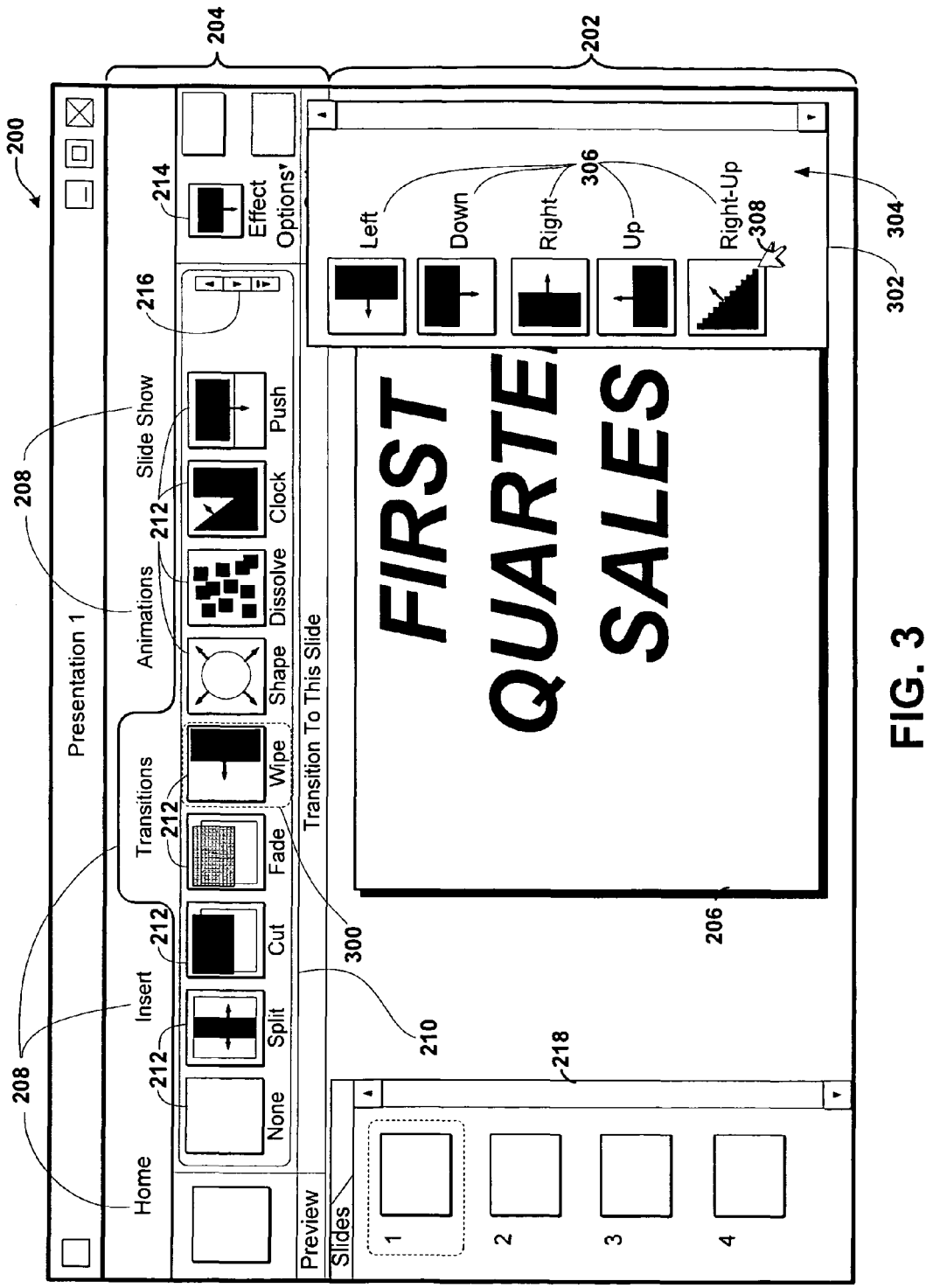
FIG. 3 is an example screen diagram illustrating the first graphical user interface with a variation control gallery displayed.
Figure 4:
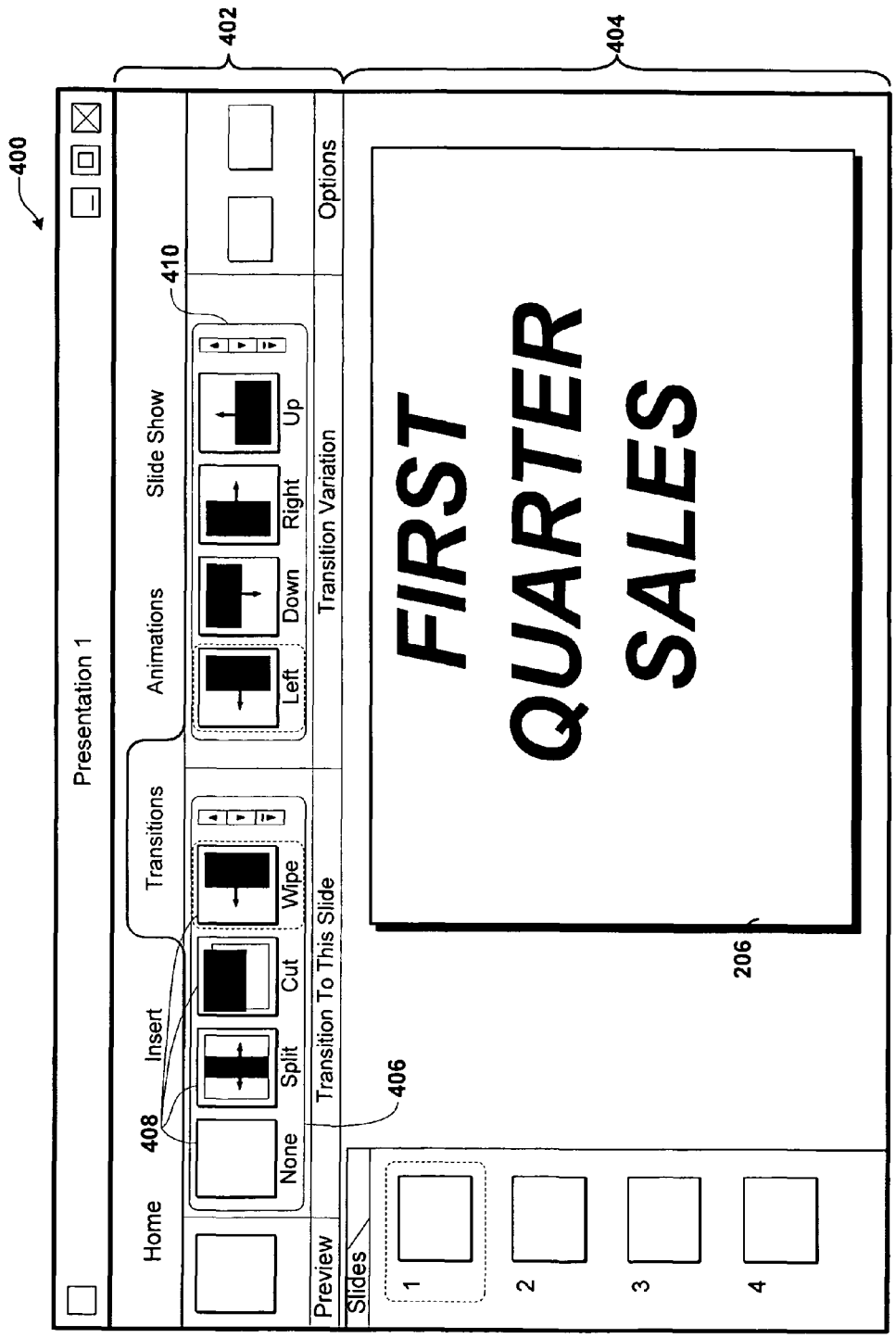
FIG. 4 is an example screen diagram illustrating a second graphical user interface.

FIGS. 2-4 are example screen diagrams illustrating user interfaces. FIGS. 2-4 illustrate a process by which a user uses the user interfaces to find a control that associates a desired STE with a slide. It should be appreciated that, unless otherwise indicated, the techniques of this disclosure are not limited to STEs or slide presentation applications.

Referring now to FIG. 2, an application executing at the computing system 100 causes the computing system 100 to display a graphical user interface (GUI) 200. As illustrated in the example of FIG. 2, the GUI 200 comprises at least a document area 202 and a control ribbon 204. In the example of FIG. 2, the document area 202 contains a current slide 206. The current slide 206 is a portion of the document that the user is editing. In the example of FIG. 2, the current slide 206 contains the text "FIRST QUARTER SALES."

In the example of FIG. 2, the document area 202 also includes a slide selection area 218. The slide selection area 218 includes controls that enable the user to select a slide to edit in the document area 202. When the user selects a slide in the slide selection area 218, the computing system 100 displays a selection indicator around the control associated with the selected slide. As used in this disclosure, a selection indicator is a screen element that visually indicates to a user that a control has been selected. The selection indicator may be implemented in a variety of ways. For example, the selection indicator may be implemented as a solid semi-transparent frame around a control. In another example, the selection indicator may be implemented as a hollow frame around a control. In a third example, the selection indicator may be implemented as a bold version of a textual title of a control. Many other types of selection indicators may be possible. In the example of FIG. 2, a selection indicator is displayed around the control for slide 1.

The control ribbon 204 comprises a set of tabs 208. Each of the tabs 208 includes a set of selectable controls. The controls in each of the tabs 208 are only visible in the control ribbon 204 when the user has selected the tab. In the example of FIG. 2, the user has selected the "Transitions" tab. Consequently, the controls in the "Transitions" tab are visible in the control ribbon 204.

The control ribbon 204 comprises a class control gallery 210. The class control gallery 210 contains a plurality of selectable class controls 212. Each of the class controls 212 is associated with a different class of STE commands. Each class of STE commands is a set of related STE commands in an overall set of STE commands. For instance, in the example of FIG. 2, the class controls 212 include a class control associated with a "Wipe" class of STE commands. When a target STE of a STE command in the "Wipe" class is associated with a slide, the slide is smoothly revealed from one side to an opposite side. In the example of FIG. 2, other class controls in the class control gallery 210 may be associated with a "Split" class, a "Cut" class, a "Fade" class, a "Shape" class, a "Dissolve" class, a "Clock" class, a "Push" class, and so on.

In the example of FIG. 2, the class control gallery 210 includes a set of scroll controls 216. The user may use the scroll controls 216 to scroll through rows of controls in the class control gallery 210. For instance, the class control gallery 210 may include additional class controls not initially shown in the class control gallery 210. Using the scroll controls 216, the user causes the computing system 100 to display these additional class controls in the class control gallery 210.

In the example of FIG. 2, each of the class controls 212 contains a textual class title naming the class associated with the class control and a class icon graphically describing the class associated with the class control. For instance, in the example of FIG. 2, the class control associated with the "Wipe" class of STEs contains a textual class name "Wipe." Furthermore, in the example of FIG. 2, the class control associated with the "Wipe" class contains a class icon that graphically describes a slide being revealed from one side to an opposite side. It should be appreciated that in other implementations, class controls do not contain textual class titles.

As mentioned above, each class includes a set of related commands. For instance, in the example of FIG. 2, the "Wipe" class may include a command for revealing a slide from left to right, a command for revealing a slide from right to left, a command for revealing a slide from top to bottom, a command for revealing a slide from bottom to top, a command for revealing a slide from bottom left to top right, and so on. As this example shows, each class may include a significant number of controls. Because each class may include a significant number of controls, it may be impractical to display controls associated with each command in each of the class in the control ribbon 204 at the same time.

The computing system 100 receives class selection input from a user. The class selection input indicates a selected class control in the class control gallery 210. The computing system 100 may receive the class selection input in the variety of ways. For example, the computing system 100 may receive the class selection input via the input device 106. In another example, the computing system 100 may receive the class selection input via an electronic communications network.

In response to receiving the class selection input, the computing system 100 displays a selection indicator around the selected class control. In addition, the computing system 100 enables an options control 214. The options control 214 includes an icon and a title. In the example of FIG. 2, the title of the options control 214 is "Effect Options." The options control 214 is enabled as long as a STE is applied to the current slide 206.

Each class control in the class control gallery 210 is associated with a different default STE command. For example, the "Wipe" class control may be associated with a default STE command having a target STE in which a current slide is smoothly revealed from right to left. The default STE command for a class control may be the most commonly used STE command in the class of STE commands associated with the class control. When the user selects one of the class controls 212, the computing system 100 automatically executes the default STE command, thereby modifying the document to associate the current slide 206 with the target STE of the default STE command. In some example implementations, each STE command in a class is related in the sense that each STE command is a variation on the default STE command of the class.

Referring now to FIG. 3, the user has selected the "Wipe" class control. The user's selection of the "Wipe" class control is indicated by the selection indicator 300 around the "Wipe" class control. When the user selects the options control 214, the computing system 100 displays a popup frame 302 containing a variation control gallery 304. As used in this disclosure, a popup frame is a screen element that appears in a user interface in front of other screen elements in the user interface. While the popup frame 302 is displayed in the user interface 200, the user cannot work with any other part of the user interface 200. In other words, the popup frame 302 is modal. In another implementation, the computing system 100 displays a task pane containing the variation control gallery 304. While the task pane is displayed, the user can work in another part of the user interface 200. In other words, the task pane is non-modal.

The variation control gallery 304 includes a plurality of variation controls 306. Each of the variation controls 306 includes a variation title naming a STE command associated with the variation control and a variation icon graphically describing the effect of applying the STE command associated with the variation control. The variation control gallery 304 is scrollable such that a user can scroll down within the variation control gallery 304 to reveal additional variation controls.

When the user selects one of the variation controls 306, the computing system 100 applies the command associated with the selected variation control to the current slide 206. In the example of FIG. 3, when the computing system 100 applies the command associated with the selected variation control to the current slide 206, the computing system 100 modifies the document to indicate that a particular STE is associated with the current slide. When a presenting device presents a slideshow based on the document, the presenting device performs the STE associated with the current slide 206 when the presenting device presents the current slide 206. As used in this disclosure, a presenting device is an electronic computing device presenting a slideshow based on the document.

The user can select multiple slides using the slide selection area 218. When the user selects multiple slides, the computing system 100 displays a selection indicator around one of the class controls 212 when each of the selected slides are associated with target STEs of STE commands in the class associated with class control. The computing system 100 does not display a selection indicator around any of the class controls 212 when two or more of the selected slides are associated with target STEs of STE commands in different classes. Similarly, the computing system 100 displays a selection indicator around one of the variation controls 306 when each of the selected slides are associated with the target STE of the STE command associated with the variation control. The computing system 100 does not display a selection indicator around any of the variation controls 306 when two or more of the selected slides are associated with different STEs. When the user selects one of the variation controls 306, the computing system 100 does not remove the selection indicator around the selected class control. In one example implementation, the user may associate a single STE with each of the selected slides at the same time by selecting a class control in the class control gallery 210 and a variation control in the variation control gallery 304.

In one example implementation, when the user positions a cursor 308 over one of the class controls 212, the computing system 100 displays a preview of the default STE associated with the class control. Similarly, when the user positions the cursor 308 over one of the variation controls 306, the computing system 100 displays a preview of the STE associated with the variation control. A preview of a STE shows the user what the STE would look like if the user selected the control associated with the STE.

FIG. 4 is an example screen diagram illustrating a second example graphical user interface 400. In the example of FIG. 4, the graphical user interface 400 contains a control ribbon 402 and a document area 404. The document area 404 is similar in function to the document area 202 in FIGS. 2 and 3. Like the control ribbon 204 in FIGS. 2 and 3, the control ribbon 402 includes a class control gallery 406. The class control gallery 406 is similar in function and content to the class control gallery 210 in FIGS. 2 and 3. Similarly, the class control gallery 406 includes class controls 408. The class controls 408 in the class control gallery 406 are similar in function to the class controls 212 in FIGS. 2 and 3.

In addition to the class control gallery 406, the control ribbon 402 includes a variation the control gallery 410. The variation control gallery 410 is similar in function and content to the variation control gallery 304 in FIG. 3. When the user selects a class control in the class control gallery 406, the computing system 100 automatically displays variation controls associated with commands in a class associated with the selected class control.

Although FIGS. 2-4 describe the techniques of this disclosure with reference to STEs, the techniques are not so limited. Rather, the techniques may be applied with regard to other types of commands. For example, the "Animations" tab shown in FIGS. 2-4 may contain a class control gallery containing controls associated with classes of in-slide object animation effects that can be applied to in-slide objects within an individual slide. In this example, a slide contains a plurality of in-slide objects visibly displayed in a current slide. Furthermore, in this example, the computing system 100 receives an object selection input from the user, the object selection input indicating a selected in-slide object in the plurality of in-slide objects. In this example, the computing system 100 presents a variation control gallery containing variation controls associated with in-slide object animation effect commands in the selected class of in-slide object animation effect commands. In this example, when the computing system 100 receives from the user a variation selection input indicating one of the variation controls, the computing system 100 modifies the document to indicate that an in-slide object animation effect is associated with the selected in-slide object. A presenting device performs the in-slide object animation effect when the presenting device displays the slide containing the selected in-slide object. In some implementations, multiple in-slide object animation effects can be associated with a single in-slide object. For instance, a presenting device can apply a first in-slide object animation effect to an in-slide object when the in-slide object appears on the slide and another in-slide object animation effect when the in-slide object is removed from the slide. In these implementations, the variation control gallery includes a special control indicating that multiple in-slide object animation effects are associated with the in-slide object.

Figure 5:
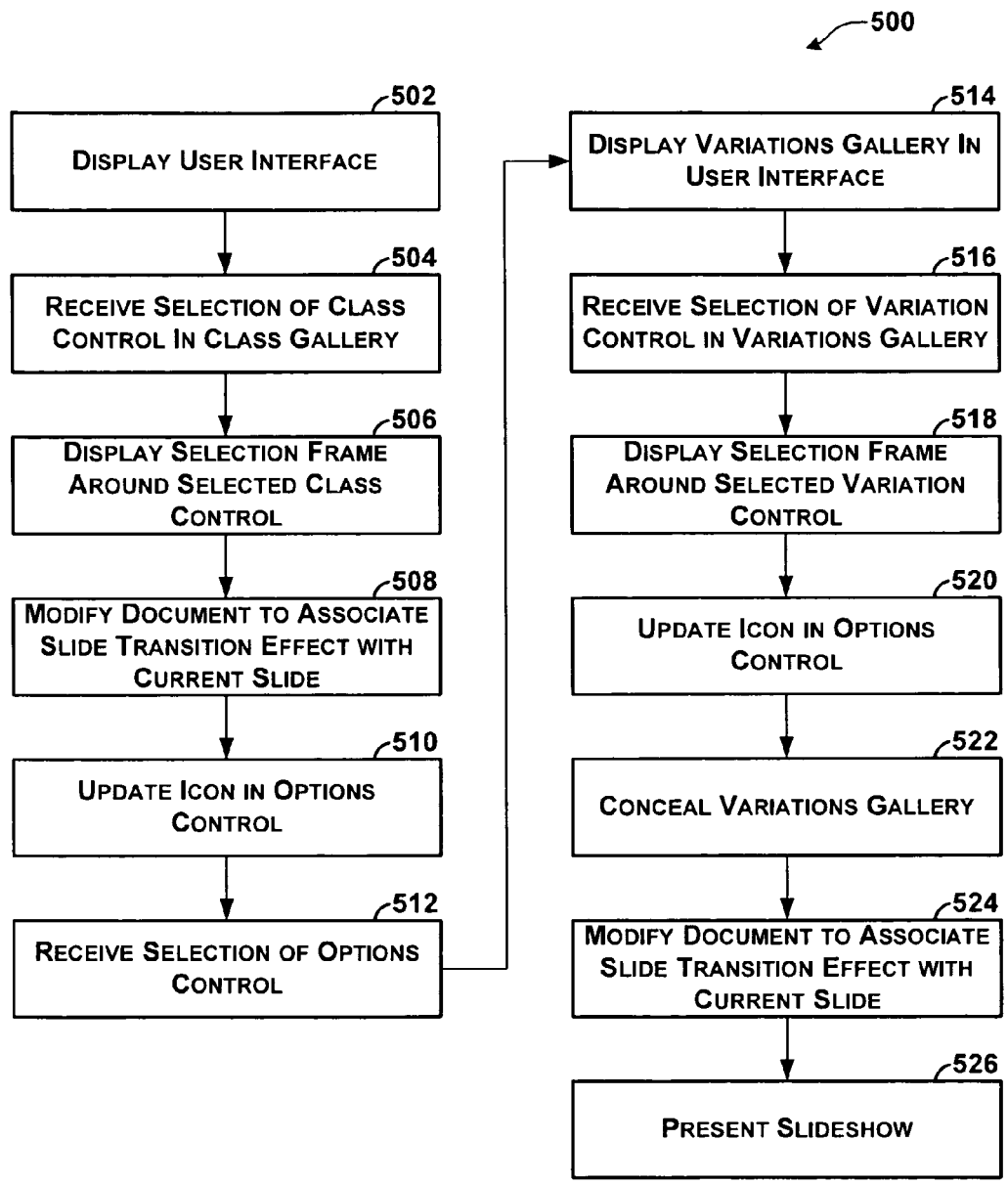
FIG. 5 is a flowchart illustrating an example operation of the computing system.

FIG. 5 is a flowchart illustrating an example operation 500 of the computing system 100. It should be appreciated that the operation 500 represents only one of many possible operations of the computing system 100. It should be appreciated that other operations of the computing system 100 may include more or fewer steps or may include the steps of the operation 500 in a different order. Furthermore, the operation 500 is explained with reference to the examples of FIGS. 2 and 3. It should be appreciated that the computing system 100 may perform a similar operation with respect to the example of FIG. 4. In addition, the operation 500 is explained with reference to STE commands. It should be appreciated that the operation 500 may be performed with regard to other types of commands.

Initially, the computing system 100 displays the GUI 200 (502). Next, the computing system 100 receives a class selection input from the user (504). The class selection input indicates that the user has selected a selected class control from among the class controls 212. The selected class control is associated with a selected class of STE commands. In response to receiving the class control input, the computing system 100 displays a selection indicator around the selected class control (506).

Further, in response to receiving the class selection input, the computing system 100 modifies the document by executing a default STE command of the selected class (508). When the computing system 100 executes the default STE command, the computing system 100 modifies the document to associate a target STE of the default STE command with the current slide. In addition, the computing system 100 updates the icon of the options control 214 such that the icon of the options control 214 graphically describes the default STE command (510).

Subsequently, the user may choose to select the options control 214. When the user selects the options control 214, the computing system 100 receives an options control selection input from the user (512). The options control selection input indicates that the user has selected the options control 214. In response to receiving the options control selection input, the computing system 100 displays the popup frame 302 containing the variation control gallery 304 in the GUI 200 (514). As discussed above, the variation control gallery 304 includes variation controls in the class associated with the selected class control. Thus, the popup frame 302 includes a different variation control gallery depending on which one of the class controls 212 the user selected.

While the variation control gallery 304 is displayed, the computing system 100 receives a variation selection input from the user (516). The variation selection input indicates a selected variation control from among the variation controls 306 in the variation control gallery 304. In response to the variation selection input, the computing system 100 displays a selection indicator around the selected variation control (518). In addition, as a further response to the variation selection input, the computing system 100 updates the icon of the options control 214 such that the icon graphically describes the STE command associated with the selected variation control (520). The computing system 100 also conceals the variation control gallery 304 in response to receiving the variation selection input (522).

Furthermore, in response to receiving the variation selection input, the computing system 100 modifies the document by executing the STE command associated with the selected variation control (524). When executed, the STE command modifies the document to associate the current slide 206 with the target STE of the STE command.

The STE command may associate the target STE of the STE command with the current slide 206 in a variety of ways. In one example implementation, the document is stored as an extensible markup language (XML) document. In this example, the XML document includes an XML element for each slide in a slideshow. Furthermore, in this example, when the computing system 100 executes the STE command associated with the selected variation control, the computing system 100 adds a STE element to the XML file as a child element of the XML element for the current slide 206. The STE element identifies the class associated with the selected class control. In this example, the STE element includes attributes that specify parameters of the target STE of the STE command associated with the selected variation control. As discussed above with regard to one example implementation, each of the target STEs of STE commands in a class of STE commands use a common set of primitives. Each of the target STEs of commands in the class of commands differ with regard to the parameters provided to the common set of primitives. Thus, in this example, each of the target STEs of STE commands in a class of commands is represented in the XML document with a single type of XML element and the STEs in the class are differentiated by the attributes of the XML element.

Subsequently, a presenting device presents the slideshow (526). The presenting device may a variety of different computing systems. For instance, the presenting device may be the computing system 100. In a second instance, the presenting device may be another computing system that takes the document as input.

Figure 6:
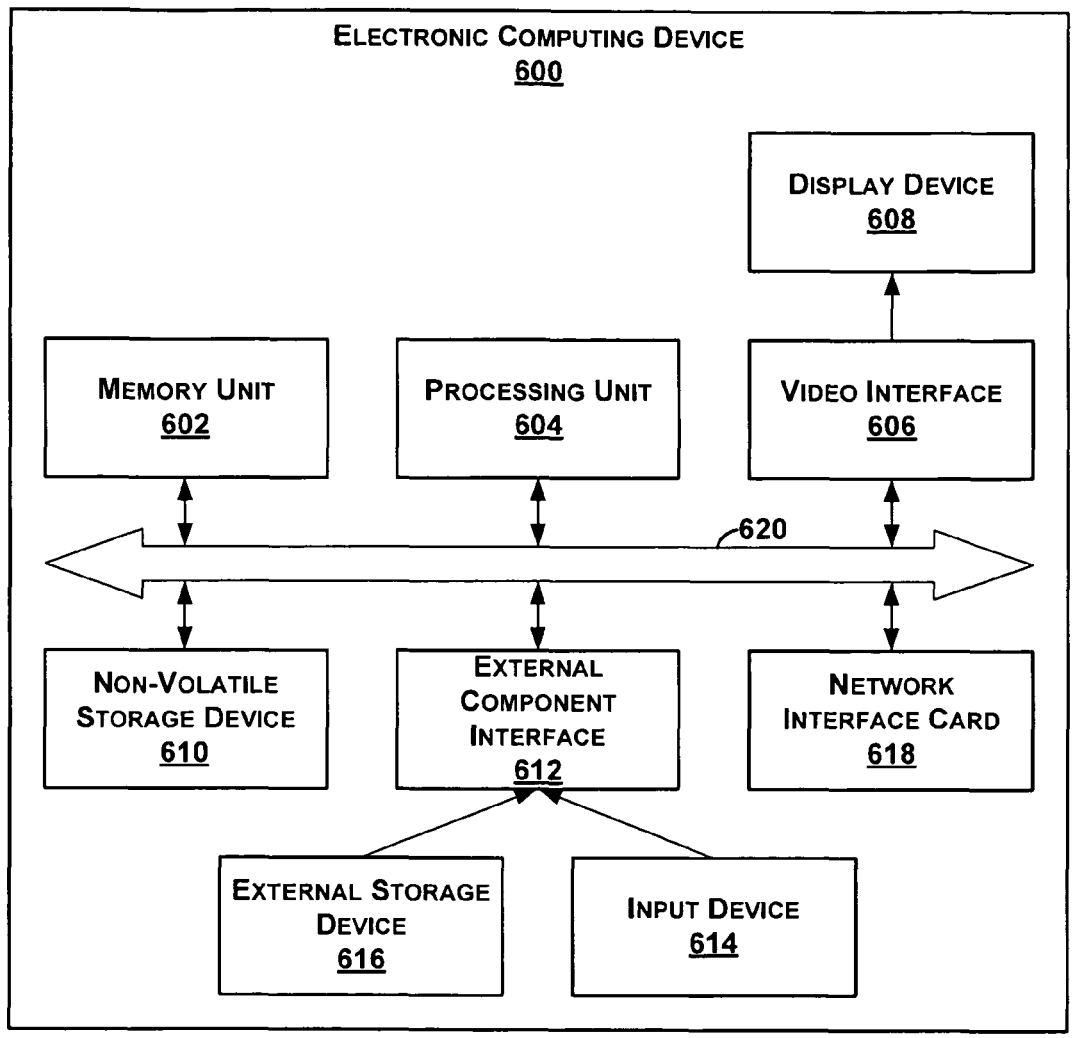
FIG. 6 is a block diagram illustrating an example electronic computing device.

FIG. 6 is a block diagram illustrating example physical components of an electronic computing device 600. As illustrated in the example of FIG. 6, the electronic computing device 600 comprises a memory unit 602. The memory unit 602 is a computer-readable data storage medium capable of storing data and/or instructions. The memory unit 602 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, the electronic computing device 600 comprises a processing unit 604. As mentioned above, a processing unit is a set of one or more physical electronic integrated circuits that are capable of executing instructions. In a first example, the processing unit 604 may execute software instructions that cause the electronic computing device 600 to provide specific functionality. In this first example, the processing unit 604 may be implemented as one or more processing cores and/or as one or more separate microprocessors. For instance, in this first example, the processing unit 604 may be implemented as one or more Intel Core 2 microprocessors. The processing unit 604 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, the processing unit 604 may be implemented as an ASIC that provides specific functionality. In a third example, the processing unit 604 may provide specific functionality by using an ASIC and by executing software instructions.

The electronic computing device 600 also comprises a video interface 606. The video interface 606 enables the electronic computing device 600 to output video information to a display device 608. The display device 608 may be a variety of different types of display devices. For instance, the display device 608 may be a cathode-ray tube display, an LCD display panel, a plasma screen display panel, a touch-sensitive display panel, a LED array, or another type of display device.

In addition, the electronic computing device 600 includes a non-volatile storage device 610. The non-volatile storage device 610 is a computer-readable data storage medium that is capable of storing data and/or instructions. The non-volatile storage device 610 may be a variety of different types of non-volatile storage devices. For example, the non-volatile storage device 610 may be one or more hard disk drives, magnetic tape drives, CD-ROM drives, DVD-ROM drives, Blu-Ray disc drives, or other types of non-volatile storage devices.

The electronic computing device 600 also includes an external component interface 612 that enables the electronic computing device 600 to communicate with external components. As illustrated in the example of FIG. 6, the external component interface 612 enables the electronic computing device 600 to communicate with an input device 614 and an external storage device 616. In one implementation of the electronic computing device 600, the external component interface 612 is a Universal Serial Bus (USB) interface. In other implementations of the electronic computing device 600, the electronic computing device 600 may include another type of interface that enables the electronic computing device 600 to communicate with input devices and/or output devices. For instance, the electronic computing device 600 may include a PS/2 interface. The input device 614 may be a variety of different types of devices including, but not limited to, keyboards, mice, trackballs, stylus input devices, touch pads, touch-sensitive display screens, or other types of input devices. The external storage device 616 may be a variety of different types of computer-readable data storage media including magnetic tape, flash memory modules, magnetic disk drives, optical disc drives, and other computer-readable data storage media.

In addition, the electronic computing device 600 includes a network interface card 618 that enables the electronic computing device 600 to send data to and receive data from an electronic communication network. The network interface card 618 may be a variety of different types of network interface. For example, the network interface card 618 may be an Ethernet interface, a token-ring network interface, a fiber optic network interface, a wireless network interface (e.g., WiFi, WiMax, etc.), or another type of network interface.

The electronic computing device 600 also includes a communications medium 620. The communications medium 620 facilitates communication among the various components of the electronic computing device 600. The communications medium 620 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The electronic computing device 600 includes several computer-readable data storage media (i.e., the memory unit 602, the non-volatile storage device 610, and the external storage device 616). Together, these computer-readable storage media may constitute a single data storage system (e.g., the data storage system 104). As discussed above, a data storage system is a set of one or more computer-readable data storage mediums. This data storage system may store instructions executable by the processing unit 604. Activities described in the above description may result from the execution of the instructions stored on this data storage system. Thus, when this description says that a particular logical module performs a particular activity, such a statement may be interpreted to mean that instructions of the logical module, when executed by the processing unit 604, cause the electronic computing device 600 to perform the activity. In other words, when this description says that a particular logical module performs a particular activity, a reader may interpret such a statement to mean that the instructions configure the electronic computing device 600 such that the electronic computing device 600 performs the particular activity.

The techniques of this disclosure may be realized in many ways. For example, the techniques of this disclosure may be realized as a method for receiving input from a graphical user interface, the method comprising displaying, by a computing device, a graphical user interface on a display device. The graphical user interface comprises a document area and a control ribbon. The document area contains at least a portion of a document that a user is currently editing. The control ribbon contains a first control gallery. The first control gallery contains a plurality of class controls. Each class control in the plurality of class controls is associated with a different class in a plurality of classes. Each class control in the plurality of class controls contains a class icon graphically describing the class associated with the class control. Each class in the plurality of classes is a subset of related commands in an overall set of commands. The method further comprises while the first control gallery is displayed, receiving, at the computing device, a class selection input from the user. The class selection input indicates a selected class control in the plurality of class controls. The selected class control is associated with a selected class in the plurality of classes. The method also comprises after receiving the class selection input, displaying, by the computing device, a second control gallery in the graphical user interface. The second control gallery contains a plurality of variation controls. Each variation control in the plurality of variation controls is associated with a different command in the selected class. Each variation control in the plurality of variation controls contains a variation icon graphically describing the command associated with the variation control. The method also comprises while the second control gallery is displayed, receiving, at the computing device, a variation selection input from the user. The variation selection input indicating a selected variation control in the plurality of variation controls. Furthermore, the method comprises in response to receiving the variation selection input, modifying, by the computing device, the document by executing the command associated with the selected variation control.

In another example, the techniques of this disclosure may be realized as an electronic computing system comprising a display device and a processing unit comprising at least one integrated circuit. The electronic computing system also comprises a data storage system comprising at least one computer-readable data storage medium. The data storage system comprises instructions that, when executed by the processing unit cause the electronic computing device to display a graphical user interface on the display device. The graphical user interface comprises a document area and a control ribbon. The document area contains at least a portion of a document that a user is currently editing. The control ribbon contains a first control gallery. The first control gallery contains a plurality of class controls. Each class control in the plurality of class controls is associated with a different class in a plurality of classes. Each class control in the plurality of class controls contains a class icon graphically describing the class associated with the class control. Each class in the plurality of classes is a subset of related commands in an overall set of commands. The instructions also cause the electronic computing system to receive class selection input from the user. The class selection input indicates a selected class control from among the plurality of class controls. The selected class control is associated with a selected class in the plurality of classes. Furthermore, the instructions cause the electronic computing system to modify, in response to receiving the class selection input, the document by executing a default command associated with the selected class. The instructions also cause the electronic computing system to after receiving the class selection input, display, in the graphical user interface, a second control gallery in the graphical user interface. The second control gallery contains a plurality of variation controls. Each variation control in the plurality of variation controls is associated with a different command in the selected class. The second control gallery does not contain any variation controls in ones of the classes other than the selected class. In addition, the instructions cause the electronic computing system to receive, while the second control gallery is displayed, a variation selection input from the user. The variation selection input indicates a selected variation control in the plurality of variation controls in the second control gallery. Furthermore, the instructions cause the electronic computing system to modify, in response to receiving the variation selection input, the document by executing the command associated with the selected variation control.

In another example, the techniques of this disclosure may be realized as a computer-readable data storage medium storing computer-executable instructions that, when executed by a processing unit of an electronic computing system, cause the electronic computing system to display a graphical user interface on a display device. The graphical user interface comprises a document area and a control ribbon. The document area contains a current slide in a slideshow document that a user is currently editing. The slideshow document is stored as a set of XML elements representing slides in a slideshow. The control ribbon contains a plurality of selectable tabs. Each tab in the plurality of selectable tabs contains one or more selectable controls. The plurality of selectable tabs includes a transitions tab. The transitions tab contains a class control gallery. The class control gallery contains a plurality of class controls. Each class control in the plurality of class controls is associated with a different class of commands in a plurality of classes of commands. Each class control in the plurality of class controls contains a textual class title naming the class of commands associated with the class control and a class icon graphically describing the class of commands associated with the class control. Each class in the plurality of classes of commands being a subset of an overall set of commands. Each command in the overall set of commands having a different target slide transition effect (STE). The transitions tab further contains an options control. The options control contains a title and an icon. The instructions also cause the electronic computing system to while the transitions tab is displayed, receive class selection input from a user, the class selection input indicating a selected class control from among the plurality of class controls. The selected class control is associated with a selected class of commands in the plurality of classes of commands. The instructions also cause the electronic computing system to display, in response to receiving the class selection input, a selection indicator around the selected class control. Furthermore, the instructions cause the electronic computing system to receive, after receiving the class selection input, an options control selection input from the user. The options control selection input indicates that the user has selected the options control. In addition, the instructions cause the electronic computing system to display, in response to receiving the options control selection input, a popup frame within the graphical user interface. The popup frame contains a variation control gallery. The variation control gallery contains a plurality of variation controls. Each variation control in the plurality of variation controls is associated with a different command in the selected class of commands. Each variation control in the plurality of variation controls contains a variation title naming the command associated with the variation control and a variation icon graphically describing the command associated with the variation control. In addition, the instructions cause the electronic computing system to receive, while the variation control gallery is displayed, a variation selection input from the user. The variation selection input indicates a selected variation control in the plurality of variation controls. Furthermore, the instructions cause the electronic computing system to update the icon in the options control to graphically describe the target STE of the command associated with the selected variation control. The instructions also cause the electronic computing system to modify the slideshow document to include a STE XML element as a child element of a XML element for the current slide. The STE XML element identifies the selected class of commands. The STE XML element includes attributes specifying parameters of the target STE of the command associated with the selected variation control. The instructions also cause the electronic computing system to present a slideshow using the slideshow document as input.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for receiving input from a graphical user interface, the method comprising:
   displaying, by a computing device, a graphical user interface on a display device, the graphical user interface comprising a document area and a control ribbon, the document area containing at least a portion of a document that a user is currently editing, the control ribbon containing a first horizontal control gallery, the first horizontal control gallery containing a plurality of class controls, each class control in the plurality of class controls associated with a different class in a plurality of classes, each class control in the plurality of class controls containing a class icon graphically describing the class associated with the class control, each class in the plurality of classes being a subset of commands in an overall set of commands;
   selecting one of the plurality of class controls displayed in the first horizontal control gallery;
   in response to selecting one of the plurality of class controls in the first horizontal control gallery, displaying a preview of a default slide transition effect (STE) associated with the one of the plurality of class controls;
   while the first horizontal control gallery is displayed, receiving, at the computing device, a class selection input from the user, the class selection input indicating a selected class control in the plurality of class controls, the selected class control associated with a selected class in the plurality of classes;
   after receiving the class selection input, displaying, by the computing device, a second vertical control gallery in the graphical user interface, the second vertical control gallery being separate from and not graphically connected to the first horizontal control gallery, the second vertical control gallery containing a plurality of variation controls, each variation control in the plurality of variation controls associated with a different command in the selected class, each variation control in the plurality of variation controls containing a variation icon graphically describing the command associated with the variation control;
   selecting one of the plurality of variation controls displayed in the second vertical control gallery;
   in response to selecting one of the plurality of variation controls in the second vertical control gallery, displaying a preview of a default slide transition effect (STE) associated with the one of the plurality of variation controls;
   while the second vertical control gallery is displayed, receiving, at the computing device, a variation selection input from the user, the variation selection input indicating a selected variation control in the plurality of variation controls; and
   in response to receiving the variation selection input, modifying, by the computing device, the document by executing the command associated with the selected variation control.

2. The method of claim 1,
   wherein displaying the graphical user interface comprises displaying an options control in the control ribbon;

wherein the method further comprises:
in response to receiving the class selection input, enabling, by the computing device, the options control; and
while the options control is enabled, receiving, at the computing device, an options control selection input from the user, the options control selection input indicating that the user has selected the options control; and
wherein displaying the second vertical control gallery comprises displaying, by the computing device, the second vertical control gallery in response to receiving the options control selection input.

3. The method of claim 2, wherein displaying the second vertical control gallery comprises: displaying, by the computing device, the second vertical control gallery in a popup frame within the graphical user interface.

4. The method of claim 2,
wherein the options control contains an icon and a title naming the options control; and
wherein the method further comprises, in response to receiving the variation selection input, updating, by the computing device, the icon in the options control such that the icon in the options control graphically describes the command associated with the selected variation control.

5. The method of claim 1, wherein displaying the second vertical control gallery comprises: displaying, by the computing device, the second vertical control gallery in the control ribbon.

6. The method of claim 1,
wherein the document is a slideshow document comprising a the plurality of slides;
wherein a current slide in the plurality of slides is the portion of the document that the user is currently editing;
wherein each of the commands in the overall set of commands has a different target STE; and
wherein modifying the document by executing the command associated with the selected variation control comprises modifying the slideshow document to associate a target STE of the command associated with the selected variation control with the current slide.

7. The method of claim 6, wherein, for each class in the plurality of classes, the target STEs of each command in the class are implemented using a shared set of primitives; wherein no two commands in different classes have target STEs implemented using a shared set of primitives.

8. The method of claim 6,
wherein the slideshow document is an Extensible Markup Language (XML) document; and
wherein modifying the slideshow document comprises adding a STE XML element to the XML document as a child element of a slide XML element, the slide XML element representing the current slide, the STE XML element identifying the selected class, the STE XML element containing attributes indicating parameters of the target STE of the command associated with the selected variation control.

9. The method of claim 1,
wherein the document is a slideshow document comprising the plurality of slides, a current slide in the plurality of slides containing a plurality of in-slide objects visually displayed in the current slide;
wherein the current slide is the portion of the document that the user is currently editing;
wherein each of the commands in the overall set of commands, when executed, modifies the document to associate a different in-slide object animation effect with an in-slide object;
wherein the method further comprises: receiving, at the computing device, an object selection input from the user, the object selection input indicating a selected in-slide object in the plurality of in-slide objects;
wherein modifying the document comprises modifying the slideshow document to indicate that the selected in-slide object is associated with an in-slide object animation effect.

10. The method of claim 1, wherein the computing device comprises: a processing unit, a data storage system, and a communication medium enabling communication between the processing unit and the data storage system, the data storage system storing instructions that, when executed by the processing unit, configure the computing device to perform each of the steps of claim 1.

11. The method of claim 1 further comprising: in response to receiving the class selection input, modifying, by the computing device, the document by executing a default command in the selected class.

12. The method of claim 1 further comprising:
in response to receiving the class selection input, displaying, by the computing device, a first selection indicator around the selected class control, the first selection indicator visually indicating to the user that the selected class control has been selected; and
in response to receiving the variation selection input, displaying, by the computing device, a second selection indicator around the selected variation control without removing the first selection indicator, the second selection indicator visually indicating to the user that the selected variation control has been selected.

13. The method of claim 1 further comprising: after modifying the document, presenting, by a presenting device, a slideshow using the document as input.

14. The method of claim 1, wherein each class control in the plurality of class controls contains a textual class name naming the class associated with the class control and each variation control in the plurality of variation controls contains a variation title naming the command associated with the variation control.

15. An electronic computing system comprising:
a display device;
a processing unit comprising at least one integrated circuit; and
a data storage system comprising at least one computer-readable data storage medium, the data storage system comprising instructions that, when executed by the processing unit cause the electronic computing device to:
display a graphical user interface on the display device, the graphical user interface comprising a document area and a control ribbon, the document area containing at least a portion of a document that a user is currently editing, the control ribbon containing a first horizontal control gallery, the first horizontal control gallery containing a plurality of class controls, each class control in the plurality of class controls associated with a different class in a plurality of classes, each class control in the plurality of class controls containing a class icon graphically describing the class associated with the class control, each class in the plurality of classes being a subset of related commands in an overall set of commands;

select one of the plurality of class controls displayed in the first horizontal control gallery;

in response to the selection of one of the plurality of class controls, display a preview of a default slide transition effect (STE) associated with the one of the plurality of class controls;

receive a class selection input from the user, the class selection input indicating a selected class control from among the plurality of class controls, the selected class control associated with a selected class in the plurality of classes;

modify, in response to receiving the class selection input, the document by executing a default command associated with the selected class;

after receiving the class selection input, display, in the graphical user interface, a second vertical control gallery in the graphical user interface, the second control gallery containing a plurality of variation controls, each variation control in the plurality of variation controls associated with a different command in the selected class, the second vertical control gallery not containing any variation controls in ones of the classes other than the selected class;

select one of the plurality of variation controls displayed in the second vertical control gallery;

in response to the selection of one of the plurality of variation controls in the second vertical gallery, display a preview of a default slide transition effect (STE) associated with the one of the plurality of variation controls;

receive, while the second vertical control gallery is displayed, a variation selection input from the user, the variation selection input indicating a selected variation control in the plurality of variation controls in the second vertical control gallery; and modify, in response to receiving the variation selection input, the document by executing the command associated with the selected variation control.

16. The electronic computing system of claim 15, wherein the control ribbon includes an options control;

wherein the instructions further cause the electronic computing system to receive an options control selection input from the user, the options control selection input indicating that the user has selected the options control; and wherein the instructions cause the electronic computing system to display the second vertical control gallery by causing the electronic computing system to display, in response to receiving the options control selection input, the second vertical control gallery in a popup frame within the graphical user interface.

17. The electronic computing system of claim 15, wherein the instructions cause the electronic computing system to display the second vertical control gallery by causing the electronic computing system to display the second vertical control gallery in the control ribbon in response to receiving the class selection input.

18. The electronic computing system of claim 15, wherein the document is a slideshow document comprising the plurality of slides;

wherein a current slide in the plurality of slides is the portion of the document that the user is currently editing;

wherein each of the commands in the overall set of commands has a different target STE; and wherein the instructions cause the electronic computing system to modify the document by executing the command associated with the selected variation control by causing the electronic computing system to modify the slideshow document to associate a target STE of the selected command with the current slide.

19. The electronic computing system of claim 15, wherein the at least one computer-readable data storage medium is a random access memory unit and the at least one integrated circuit is a microprocessor.

20. A computer-readable data storage medium storing computer-executable instructions that, when executed by a processing unit of an electronic computing system, cause the electronic computing system to:

display a graphical user interface on a display device, the graphical user interface comprising a document area and a control ribbon, the document area containing a current slide in a slideshow document that a user is currently editing, the slideshow document stored as a set of Extensible Markup Language (XML) elements representing slides in a slideshow, the control ribbon containing a plurality of selectable tabs, each tab in the plurality of selectable tabs containing one or more selectable controls, the plurality of selectable tabs including a transitions tab, the transitions tab containing a horizontal class control gallery, the horizontal class control gallery containing a plurality of class controls, each class control in the plurality of class controls associated with a different class of commands in a plurality of classes of commands, each class control in the plurality of class controls containing a textual class title naming the class of commands associated with the class control and a class icon graphically describing the class of commands associated with the class control, each class in the plurality of classes of commands being a subset of an overall set of commands, each command in the overall set of commands having a different target slide transition effect (STE), the transitions tab further containing an options control, the options control containing a title and an icon;

select one of the plurality of class controls displayed in the horizontal class control gallery;

in response to the selection of one of the plurality of class controls, display a preview of a default slide transition effect (STE) associated with the one of the plurality of class controls;

while the transitions tab is displayed, receive class selection input from a user, the class selection input indicating a selected class control from among the plurality of class controls, the selected class control associated with a selected class of commands in the plurality of classes of commands;

display, in response to receiving the class selection input, a selection indicator around the selected class control;

receive, after receiving the class selection input, an options control selection input from the user, the options control selection input indicating that the user has selected the options control;

display, in response to receiving the options control selection input, a popup frame within the graphical user interface, the popup frame containing a vertical variation control gallery, the vertical variation control gallery containing a plurality of variation controls, each variation control in the plurality of variation controls associated with a different command in the selected class of commands, each variation control in the plurality of variation controls containing a variation title naming the command associated with the variation control and a variation icon graphically describing the command associated with the variation control;

select one of the plurality of variation controls displayed in the vertical variation control gallery;

in response to the selection of one of the plurality of variation controls in the vertical variation control gallery, display a preview of a default slide transition effect (STE) associated with the one of the plurality of variation controls;

while the vertical variation control gallery is displayed, receive a variation selection input from the user, the variation selection input indicating a selected variation control in the plurality of variation controls;

update the icon in the options control to graphically describe the target STE of the command associated with the selected variation control; and modify the slideshow document to include a STE XML element as a child element of a XML element for the current slide, the STE XML element identifying the selected class of commands, the STE XML element including attributes specifying parameters of the target STE of the command associated with the selected variation control; and present a slideshow using the slideshow document as input.

\* \* \* \* \*